United States Patent
McNulty et al.

(10) Patent No.: US 7,284,787 B2
(45) Date of Patent: Oct. 23, 2007

(54) ROLL-FORMED PANELS FOR VEHICLE BOX ASSEMBLY

(75) Inventors: Frank G. McNulty, Rochester Hills, MI (US); D. James Zimmerman, Grosse Ile, MI (US); Edward J. Engler, Farmington Hills, MI (US)

(73) Assignee: Pullman Industries, Inc., Troy, MI (US)

( * ) Notice: Subject to any disclaimer, the term of this patent is extended or adjusted under 35 U.S.C. 154(b) by 78 days.

(21) Appl. No.: 11/105,314

(22) Filed: Apr. 13, 2005

(65) Prior Publication Data

US 2005/0236867 A1   Oct. 27, 2005

Related U.S. Application Data

(60) Provisional application No. 60/561,803, filed on Apr. 13, 2004.

(51) Int. Cl.
*B62D 33/02* (2006.01)

(52) U.S. Cl. .............. 296/183.1; 296/181.4; 296/182.1

(58) Field of Classification Search ........... 296/183.1, 296/181.3, 181.4, 182.1, 184.1, 186.1
See application file for complete search history.

(56) References Cited

U.S. PATENT DOCUMENTS

| | | | |
|---|---|---|---|
| 4,109,503 A | 8/1978 | Francon et al. | |
| 4,188,058 A | 2/1980 | Resa et al. | |
| 4,215,898 A | 8/1980 | Ulics | |
| 4,631,891 A | 12/1986 | Donavich | |
| 4,750,776 A | 6/1988 | Barben | |
| 5,575,525 A | 11/1996 | Walworth, Jr. et al. | |
| 5,730,486 A * | 3/1998 | Jurica | 296/184.1 |
| 5,755,481 A | 5/1998 | Emery | |
| 5,938,272 A | 8/1999 | Jurica et al. | |
| 6,128,815 A | 10/2000 | Jurica et al. | |
| 6,170,905 B1 | 1/2001 | Jurica | |
| 6,220,463 B1 * | 4/2001 | Pullen | 211/186 |
| 6,347,454 B1 | 2/2002 | Jurica et al. | |
| 6,439,649 B1 * | 8/2002 | Lorenzo et al. | 296/181.3 |

(Continued)

FOREIGN PATENT DOCUMENTS

DE   30 12 567 A1   10/1981

OTHER PUBLICATIONS

U.S. Appl. No. 11/105,328, filed Apr. 13, 2005, Inventors: Frank G. McNulty, D. James Zimmerman and Edward J. Engler.

(Continued)

*Primary Examiner*—Lori L. Lyjak
(74) *Attorney, Agent, or Firm*—Flynn, Thiel, Boutell & Tanis, P.C.

(57) ABSTRACT

An improved vehicle box assembly with an upright front or side panel defined by a monolithic one-piece roll-formed steel sheet member having a desired three-dimensional configuration. The sheet steel member is roll-formed in the lengthwise direction thereof. The panel has a channel, preferably a closed tubular channel on the front panel, roll-formed along one edge of the sheet steel during forming of the panel. The closed tubular edge rail is preferably closed by a seam weld which extends lengthwise therealong and is performed in line with the roll-forming operation. The roll-formed panel is preferably provided with a flat shelf deformed horizontally to extend lengthwise along the panel downwardly from the top rail.

17 Claims, 20 Drawing Sheets

U.S. PATENT DOCUMENTS

| | | | |
|---|---|---|---|
| 6,575,524 B2 * | 6/2003 | Grimm et al. | 296/181.3 |
| 6,644,721 B1 * | 11/2003 | Miskech et al. | 296/183.1 |
| 6,702,365 B2 * | 3/2004 | Semple et al. | 296/183.1 |
| 6,799,792 B2 | 10/2004 | Jurica et al. | |
| 2003/0218360 A1 * | 11/2003 | Henderson et al. | 296/183 |
| 2006/0097548 A1 * | 5/2006 | Kikuchi et al. | 296/183.1 |

OTHER PUBLICATIONS

U.S. Appl. No. 11/105,330, filed Apr. 13, 2005, Inventors: Frank G. McNulty, D. James Zimmerman and Edward J. Engler.

* cited by examiner

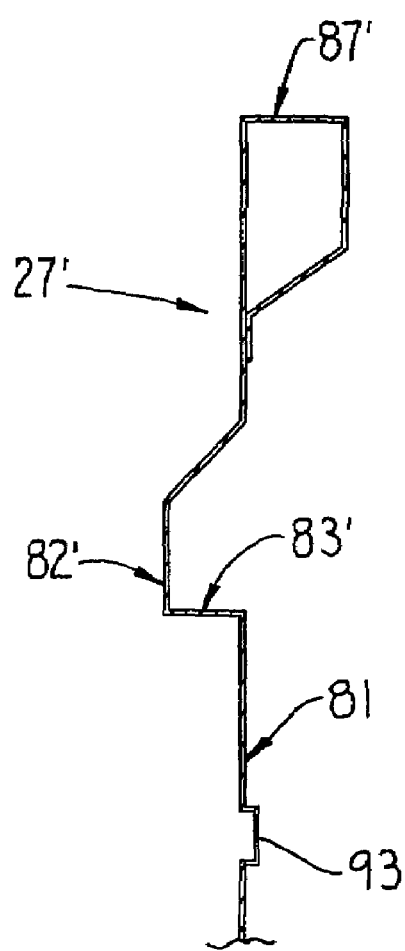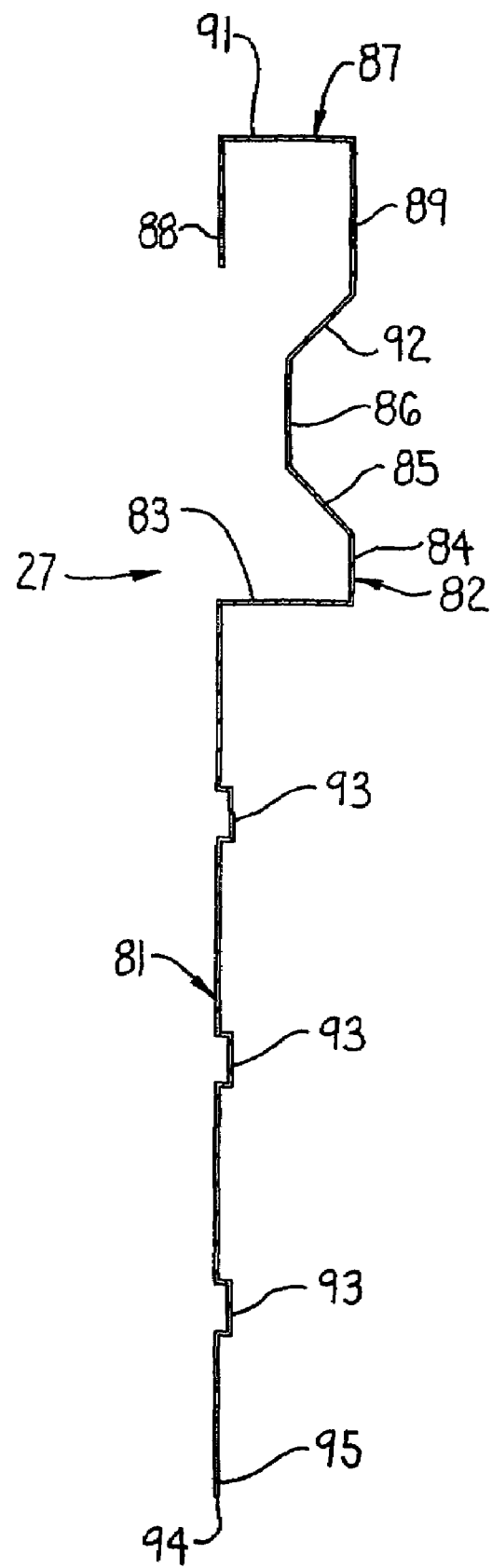
FIG. 15A
FIG. 15

ROLL-FORMED PANELS FOR VEHICLE BOX ASSEMBLY

CROSS-REFERENCE TO RELATED APPLICATIONS

This application claims priority under 35 USC §119(e) of copending provisional application U.S. Ser. No. 60/561,803 filed Apr. 13, 2004, the entire disclosure of which is herein incorporated by reference.

FIELD OF THE INVENTION

This invention relates to a box assembly for a vehicle, such as a pickup truck, and more specifically to an improved construction of a vehicle box assembly employing roll-formed panels, and to the method of constructing the panels.

BACKGROUND OF THE INVENTION

The upwardly-opening box assembly associated with vehicles such as pickup trucks and the like have, for many years, employed a large plurality of stamped metal panels for defining the box. For example, in most instances the inner front and side panels of the box are stamped sheet steel members, and in most instances the bed of the box is also defined by one or more stamped sheetlike steel panels. Forming the box predominantly from stamped sheet steel panels, however, results in structural and economic factors which are less than desirable.

A principal disadvantage associated with using stamped sheet steel panels is the fact that such panels require use of a greater quantity of material than is optimally desired, and also ultimately results in the formed members having greater weight than desired, both of which are undesirable from the standpoint of the overall vehicle. More specifically, it is known that stamping involves forming a three-dimensional shape from a flat sheet steel of rather thin gauge, and during stamping the three-dimensional deformation of the sheet steel necessarily causes stretching of the steel, particularly at those locations which are subjected to the greatest three-dimensional deformation. This stretching can typically be in the range of from 8% to 10%, and the net effect is that the thickness of the sheet steel at the stretched locations can be significantly reduced by this degree. Such significant thickness reduction hence results in areas of the sheet being of significantly reduced strength, and hence these reduced strength areas can dictate and control the design of the overall stamped part, thereby requiring initial use of a sheet thickness greater than would otherwise be required so as to compensate for the thickness reduction caused by stretching.

Stamping large sheets to define large three-dimensional panels, such as for a vehicle box assembly, also often results in undesired surface stretch marks or blemishes in the finished product. The stamping operation also typically requires that the sheet be significantly oversized relative to the finished product so as to permit trimming of the sheet around the entire peripheral edge of the finished stamped member, and this hence results in significant waste.

A further and significantly disadvantageous factor associated with use of stamped sheet steel panels for vehicle box assemblies is the cost associated with the manufacture of the required stamping tools, and the significant number of such tools required to form the different stamped panels. Since the stamped panels defining the front and side walls of the box assembly, as well as the bed, are all of rather large size, the stamping tool required to form a single panel is necessarily large and complex, and hence extremely costly to manufacture. The complexity associated with such tooling is further increased by the fact that the side and front panels typically have reinforcing channels formed along the upper edges thereof, which channels define either inverted U-shaped configurations or sometimes even a closed hollow channel, whereby the stamping tooling for such shapes involves multiple stamping steps and hence is complex and expensive.

The cost of the stamping tooling is further exacerbated by the fact that each stamped part requires its own customized stamping tooling. For example, the front panel, the right side panel and the left side panel of the bed assembly all require their own customized tooling. Further, different tooling must be provided to permit manufacture of the right and left side panels for each different bed length. Needless to say, the overall net effect is that the tooling is not only extremely costly, but the tooling also requires significant floor space in the factory, and additional labor for operation thereof.

Several currently known constructions for vehicle box assemblies employing a significant number of stamped sheet steel panels are illustrated by FIGS. 1-4. In FIG. 1, a box assembly 10 as associated with a pickup truck employs right and left upright inner side panels 11 and 12, respectively, joined to an upright inner front panel 13. The bottom of the box assembly is closed by a generally horizontal bed 14 which, in this conventional construction, employs a multiple-piece construction defined predominantly by a center bed panel 15 which extends throughout the full length of the bed and has a width which generally corresponds to the transverse width between the wheel well openings. The bed regions forwardly and rearwardly of the wheel well openings are defined by separate small bed panel sections 16 and 17 which are rigidly joined, as by welding, to the center bed panel 15 and to the adjacent upright side panels. The rear of the bed assembly defines a conventional access opening which, in a known manner, is closed by a swingable tailgate. In this known construction of the bed assembly, each of the front panel, right side panel, left side panel and bed are formed as stamped steel sheet members, all different, and in fact the bed in this example is formed by a plurality (here five) of stamped members. The wheel well covers 18, which are also typically separate stampings, are welded to the respective side panel and to the bed during the assembly process. A box assembly having constructional features similar to that illustrated by FIG. 1 hence employs a large number of different stamped members, and accordingly requires large investment in tooling as well as significant factory space for production and assembly of such construction.

FIG. 2 illustrates another known construction of a box assembly which is virtually identical to the box assembly of FIG. 1 described above, except that the bed 14' in FIG. 2 is constructed as a one-piece stamped panel having wheel well openings formed in opposite sides thereof, typically by means of a separate stamping operation, thereby eliminating the need for separate side bed panels. The construction of the box assembly of FIG. 2 is in all other respects generally similar to that illustrated by FIG. 1, and hence possesses generally the same structural and cost disadvantages.

Referring now to FIG. 3, there is illustrated improvements with respect to a box assembly for a pickup truck, which improvements are illustrated in greater detail in U.S. Pat. No. 6,644,721, owned by the Assignee hereof. The box assembly illustrated in FIG. 3 is constructed generally the same as the box assembly shown in FIG. 1 except that the center floor pan 15 in FIG. 3 is constructed as a one-piece roll-formed member which provides improved performance and weight reduction.

Considering also the box assembly illustrated in FIG. 4, this depicts another improved construction of the box assembly developed by the Assignee hereof. This improved box construction generally corresponds to the box construction of FIG. 2 except that the full-sized bed member 14' is constructed as a roll-formed member, rather than as a stamped member. This roll-formed construction of the one-piece bed member, as disclosed in greater detail in Assignee's U.S. Pat. No. 6,128,815, has been successfully commercially adopted and is currently in use on models of pickup trucks currently being sold.

As a known alternative construction for the box assembly illustrated by FIG. 1, the side panel, the adjacent wheel well cover and adjacent front and rear side bed panels can be formed as a one-piece stamping, a different such stamping being required for each of the right and left sides of the box assembly. Such stamping, however, due to its size and complex three-dimensional shape, requires complex and costly tooling.

Accordingly, it is an object of this invention to provide improved roll-formed component parts for a box assembly, such as a roll-formed front panel and/or roll-formed side panels and/or a roll-formed bed panel, which component parts provide improved characteristics with respect to construction, assembly and cost efficiencies with respect to materials, assembly and tooling, and which at the same time retain or provide improved performance characteristics with respect to the assembled box assembly.

More specifically, the improved roll-formed components of the present invention are believed to provide the assembled box assembly with improvements with respect to reduction in overall weight, reduction with respect to overall usage of material, reduction with respect to material cost, simplification with respect to required assembly, handling and manipulation, significant reduction with respect to tooling costs, and an ability to utilize the same tooling to facilitate manufacture of multiple or different sized parts.

According to the present invention, in one embodiment thereof, there is provided an improved front panel for a vehicle bed assembly, which front panel is defined by a monolithic one-piece roll-formed steel sheet member having a desired three-dimensional configuration. The sheet steel member is roll-formed in the lengthwise direction thereof, which direction extends transversely across the front of the box assembly. The front panel has a roll-formed channel, preferably a closed tubular channel, extending along the upper edge thereof, which channel is roll-formed along one edge of the sheet steel during forming of the front panel. This closed tubular edge rail is preferably closed by a seam weld which extends lengthwise therealong, which seam weld can be efficiently performed simultaneous with and directly downstream of the roll-forming operation.

The improved roll-formed front panel, as aforesaid, is preferably provided with a generally flat ledge or shelf deformed horizontally from the upright front panel so as to extend transversely across the front of the box assembly. This shelf is preferably disposed downwardly a small distance from the top rail, but is also positioned upwardly a substantial distance from the lower edge of the front panel, whereby the shelf can be successfully utilized to provide additional functions associated with use of the vehicle box assembly, such as accommodating the edge of a cover or divider platform.

The improved front panel, as aforesaid, is also preferably provided with one or more reinforcing ribs roll-formed therein and extending lengthwise thereof so as to provide the front panel with desired strength and rigidity while permitting usage of minimal thickness sheet steel.

As a desired variation, the improved roll-formed front panel, as aforesaid, can be provided with a front bed-supporting cross rail integrally and monolithically joined to the front panel along a lower horizontally extending edge thereof. The front panel and cross rail are formed as a continuous and monolithic one-piece member by being formed during a continuous roll-forming operation, with the cross rail being formed either generally planar with or in perpendicular relationship to the front panel during the roll-forming operation, with a 90° bend between the front panel and cross rail being formed either during the roll-forming operation or by means of a subsequent bending operation. The resultant monolithic one-piece construction eliminates the requirement that a wholly separate front cross rail be manufactured and handled, and also eliminates the necessity of having to create a series of spot welds between a lower flange on the front panel and a downwardly-turned front flange on the cross rail, the latter being a conventional construction.

This invention, as it relates to the front panel, also provides an improved manufacturing process for the front panel by permitting roll-forming of the front panel so as to facilitate forming of front panels of different lengths, by facilitating the simultaneous roll-forming of a closed rail or channel extending along the upper edge thereof, by facilitating seam welding of the top rail as it is formed on the roll former, prior to the panel being cut to length, and by facilitating the ability to integrally roll-form a front bed-supporting cross rail as part of the front panel.

The present invention, according to a second embodiment, relates to an improved inner side panel for a vehicle box assembly. The inner side panel is a monolithic one-piece member which is roll-formed in the lengthwise direction thereof, and is provided with a roll-formed channel extending along the upper edge. The channel may, if desired, be a closed tubular channel and may be seam welded along the length thereof. The roll-formed side panel is also preferably provided with a generally flat horizontal shelf roll-formed lengthwise thereof at a location spaced downwardly a small distance from the top rail. This shelf provides numerous possible functions, such as by permitting two-by-fours or the like to be supported thereon so as to span across the box assembly in raised relationship from the bed, or by permitting a tonneau cover to be attached thereto in downwardly spaced relation from the exposed top rail, or by permitting a removable platform or shelf to be supported on and extended between the shelves defined on the opposed inner side panels. The side panel is also preferably provided with ribs or channels roll-formed therein longitudinally throughout the length thereof to provide improved strength and rigidity, and hence permit use of minimal thickness sheet steel.

The improved roll-formed side panel of the present invention, as aforesaid, can be cut to any desired length during the roll-forming operation so that the same roll-forming tooling can readily accommodate side panels of different lengths. Further, by forming wheel well openings in the side panels utilizing separate stamping tooling which act on the side panels after the panels have been cut to length, the same roll-forming line can be used to form not only side panels of different lengths, but can also be used to form both the right and left side panels.

The improved roll-formed inner side panel of the present invention, as aforesaid, in accordance with a variation thereof, can be integrally and monolithically formed with an adjacent portion of the floor or bed, namely that portion which defines the wheel well opening. The bed portion and side wall panel can be substantially simultaneously roll-formed to define an integral and monolithic one-piece construction, and the forming of the wheel well opening and the bending of the floor portion relative to the side wall panel can be performed after the one-piece roll-formed construction is cut to length. Alternately, the forming of the opening and the subsequent bending of the floor portion relative to the side panel can be carried out in sequence during the roll-forming, prior to the cut-to-length operation.

The invention also relates to an improved manufacturing process for forming a side panel for a vehicle box which, as discussed above, is roll-formed to facilitate the forming of a top rail, a horizontal shelf and reinforcing ribs extending lengthwise of the roll-formed panel, to facilitate cutting of the roll-formed panel into any desired length, and to permit the same roll-formed tooling to be utilized for both right and left side panels as well as panels of different lengths. The process also permits simultaneous forming of multiple side panels, such as roll forming a pair of side panels in side-by-side relationship so as to be effectively mirror images of one another, thereby simultaneously providing right and left panels and at the same time facilitating the simultaneous stamping of the wheel well openings therein and the forming of the top rails thereon, which top rails are disposed along the outer edges of the roll-formed sheet, with the roll-formed sheet being split lengthwise thereof to facilitate the simultaneous forming of side-by-side panels.

The present invention, according to a further embodiment, comprises a monolithic, one-piece roll-formed center floor pan for disposition between the wheel wells of a vehicle box assembly. The improved floor pan has roll-formed raised channels of partial width extending along opposite side edges thereof, which raised partial channels have perpendicularly projecting edge flanges which protrude downwardly by an extent which significantly exceeds the height of the channels formed in the bed member. The edge flanges on the center floor pan abut and are welded to edge flanges associated with side panels which fill the regions disposed forwardly and rearwardly of the wheel well openings. The edge flanges on the center floor pan, at regions corresponding to the supporting cross rails, have recesses opening upwardly over part of the height thereof to accommodate the cross rails while still providing partial reinforcement in the regions of the floor pan disposed directly over the cross rails, thereby eliminating the need to provide deformations or recesses in the cross rail.

According to the present invention, there is provided an improved box assembly for a vehicle, such as a pickup truck, which box assembly employs a roll-formed bed or pan, as well as a roll-formed front panel as briefly summarized above, and which may additionally employ a roll-formed inner side panel, as also briefly described above. The roll-forming of the large panel members associated with the box assembly permits minimal usage of material in terms of both square footage of material as well as material thickness, thereby minimizing cost and weight of the box assembly, and results in panels of substantially uniform thickness throughout the longitudinal transverse directions thereof. The use of roll-formed panels is also desirable since it permits the panels to be formed from high strength steel if desired, specifically sheet steel having a yield strength in the range of from about 50,000 psi to about 100,000 psi, which high strength steel is typically not feasible for use with large stamped panels.

Other objects and purposes of the invention will be apparent to those familiar with constructions and processes similar to those described herein upon reading the following specification and inspecting the accompanying drawings.

BRIEF DESCRIPTION OF THE DRAWINGS

FIG. 15 is a cross-sectional view taken generally along the line 15-15 in FIG. 14.

FIG. 15A is a sectional view corresponding to FIG. 15 but showing variations in the construction of the side panel.

Figure 2:
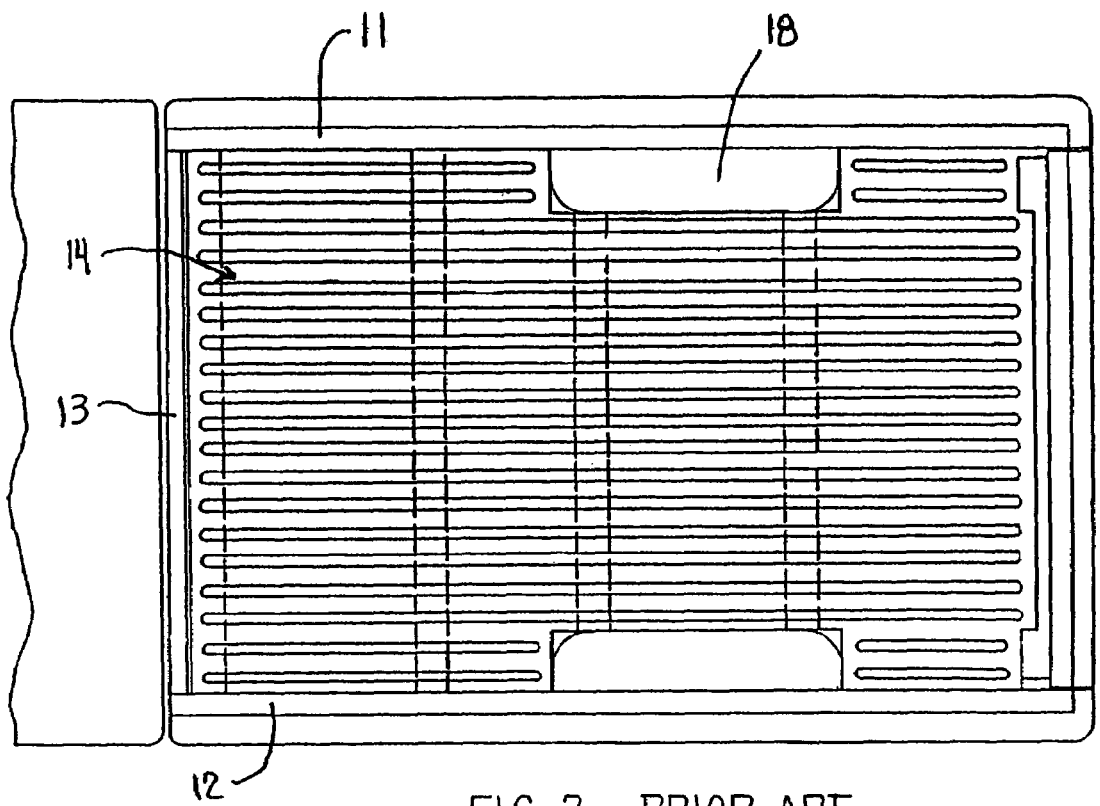
FIG. 2 is a top plan view similar to FIG. 1 but illustrating a second conventional construction of the box assembly.
Figure 1:
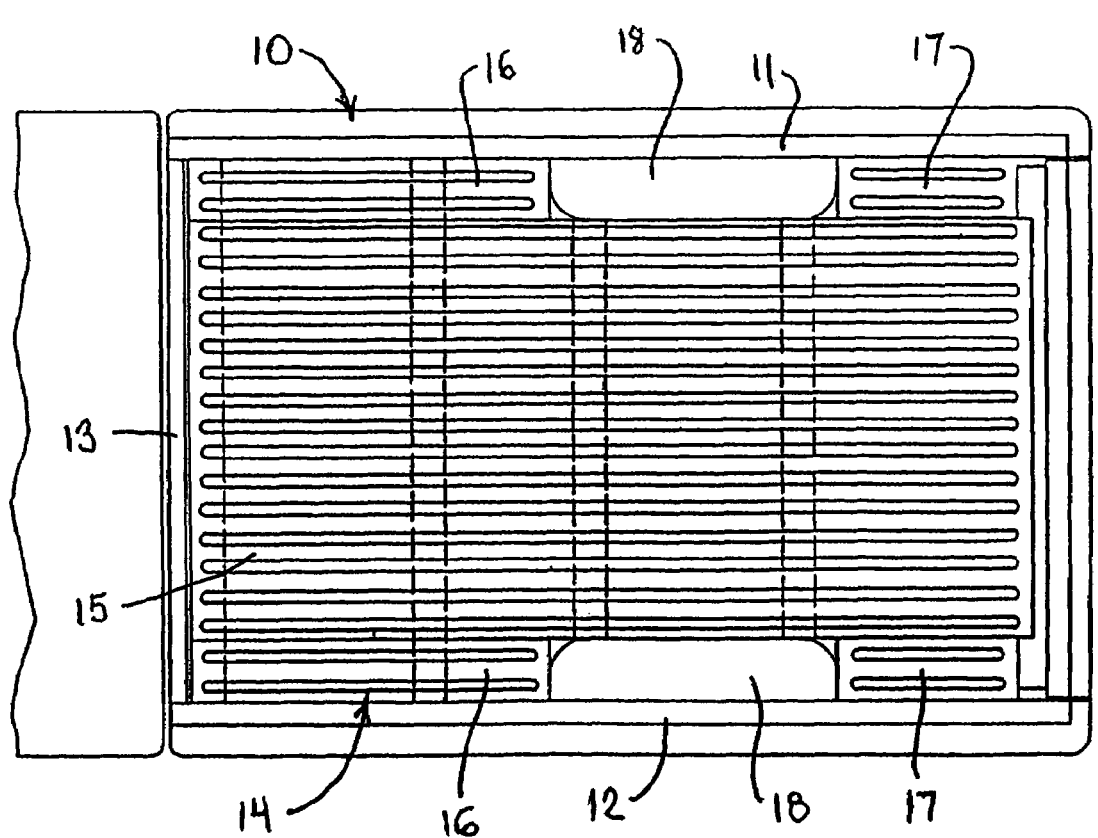
FIG. 1 is a top plan view of a conventional pickup truck box assembly which illustrates a first conventional construction of the assembly.
Figure 4:
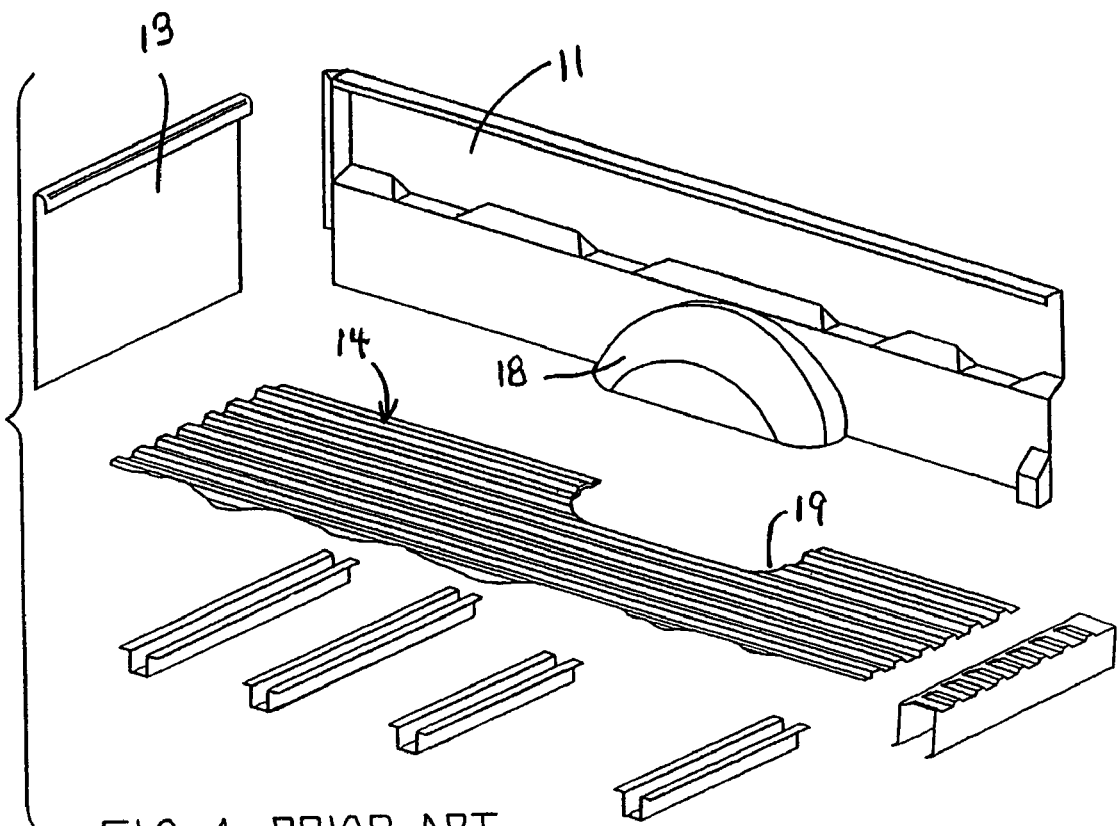
FIG. 4 is an exploded perspective view illustrating the box assembly of FIG. 2 but illustrating a known variation of the bed assembly.

Certain terminology will be used in the following description for convenience in reference only, and will not be limiting. For example, the words "upwardly", "downwardly", "rightwardly" and "leftwardly" will refer to directions in the drawings to which reference is made. The words "upwardly" and "downwardly" will also be used in reference to the surfaces or parts associated with the box assembly which respectively project upwardly or downwardly when the box assembly is in its normal assembled position on a vehicle. The words "front" and "rear" will be used with reference to those directions which normally connote the front and rear of a vehicle when the box assembly is mounted thereon. The words "inwardly" and "outwardly" will refer to directions toward and away from, respectively, the geometric center of the box assembly, or designated parts thereof. Said terminology will include the words specifically mentioned, derivatives thereof, and words of similar import.

DETAILED DESCRIPTION

Figure 5:
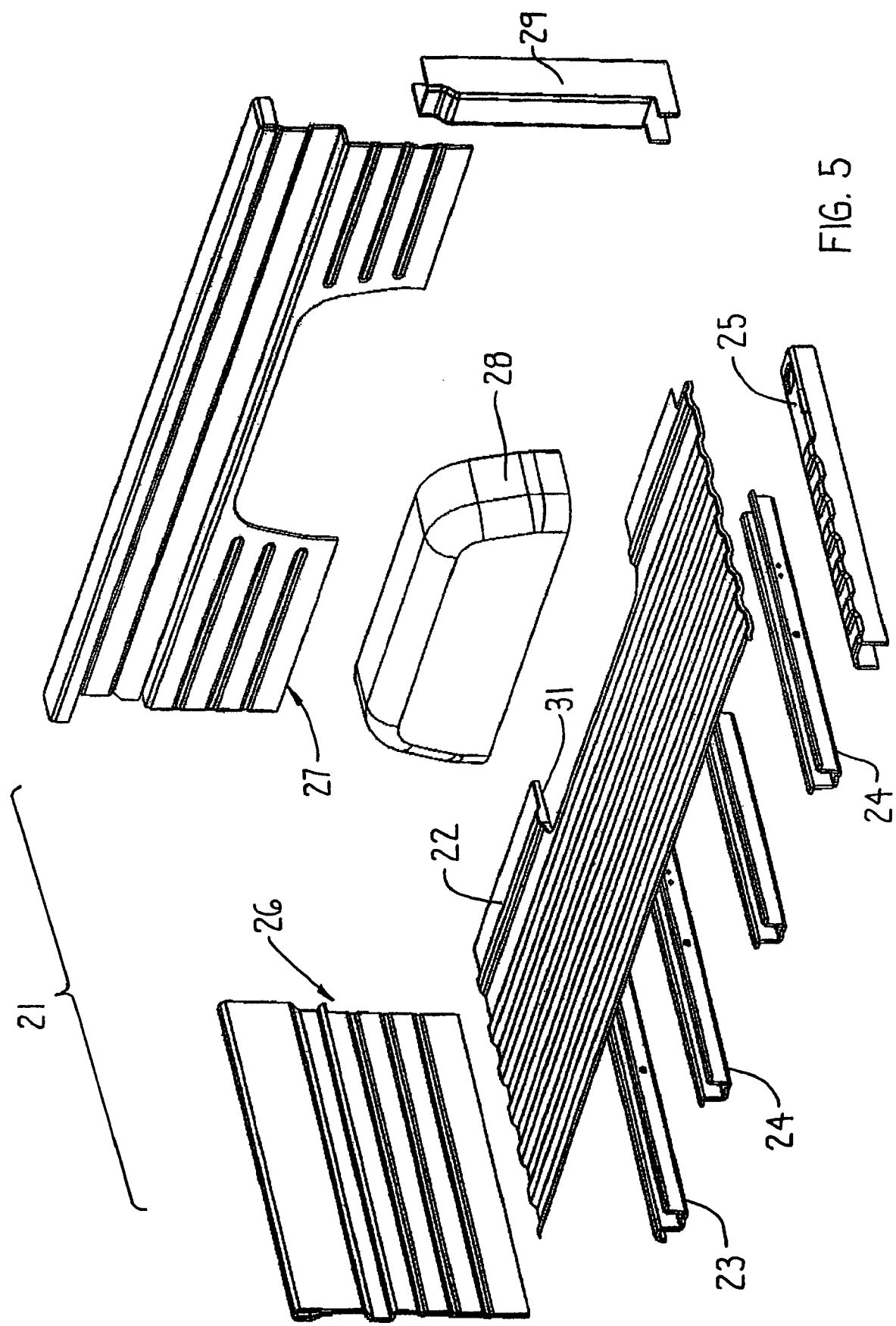
FIG. 5 is an exploded perspective view showing parts associated with an improved vehicle box assembly constructed in accordance with a first embodiment of the present invention.
Figure 6:
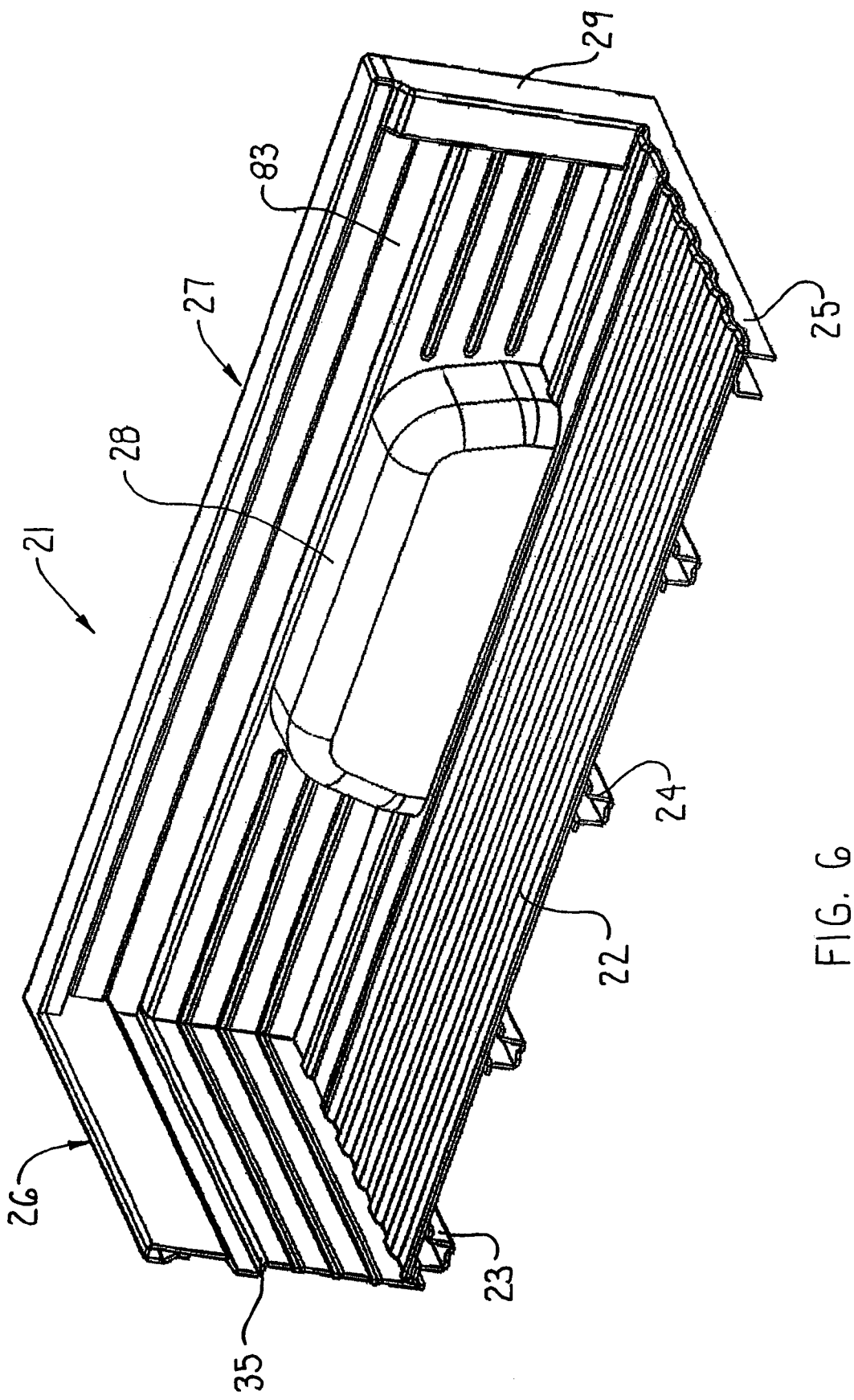
FIG. 6 is a fragmentary perspective view showing the parts of FIG. 5 in an assembled condition.

Referring to FIGS. 5 and 6, there is illustrated a first embodiment of an improved vehicle box assembly 21, specifically a box assembly for a pickup truck, according to the present invention.

The box assembly 21 includes a bed or floor pan arrangement 22 which is supported on a plurality of support or cross rails extending transversely thereunder, including a front cross rail 23 disposed adjacent the forward end of the floor, one or more generally parallel intermediate cross rails 24 disposed in rearwardly spaced but generally parallel relationship beneath the floor, and a rear cross rail 25 which supportingly engages the floor beneath the rear edge thereof. An inner upright front panel 26 projects upwardly from the floor adjacent the front end of the box assembly, and opposed right and left inner upright side panels 27 project upwardly from opposite sides of the floor and have their forward edges rigidly joined to opposite ends of the front panel 26. Only the right side panel is illustrated in FIGS. 5 and 6, the left side panel being omitted for clarity of illustration, but it will be understood that the left side panel is typically substantially a mirror image of the right side panel. The floor 22 and side wall panels 27 are each rigidly joined by a hollow three-dimensional wheel well cover or housing 28 which around the edge thereof is fixedly joined to both the side panel 27 and the floor 22 so as to isolate the rear wheel of the vehicle from the interior of the box assembly. Each upright side panel or wall 27 also has a rear post or upright 29 associated with the rear edge thereof to provide structural reinforcement. The rear post provides a structural connection between the inner side panel 27 and the outer skin of the vehicle, and also provides strength to permit support for a conventional rear tailgate as associated with the box assembly.

The construction of the significant panel components of the box assembly 21 will be described hereinafter.

Referring first to the bed or floor 22, it is preferably constructed as a monolithic one-piece roll-formed member having a series of reinforcing channels or ribs which project upwardly from the sheet and extend lengthwise so as to terminate substantially adjacent the front and rear edges of the bed, with the channels being spaced apart in the sideward or transverse direction of the bed member. The bed member 22 in this embodiment extends the full width of the box assembly so that the side edges of the bed member terminate directly adjacent the side panels 27, and the side edges of the bed member have wheel well openings 31 formed therein to accommodate the rear vehicle wheels, which wheel well openings are enclosed by the conventional wheel well covers 28, the latter typically being of a stamped construction. The rear edge of the bed 22 cooperates with the rear cross rail 25 which, in a preferred construction, can be provided with a series of sidewardly spaced upward projections which channels with the channels associated with the bed so as to reinforce the rear bed edge. Use of projections associated with the rear rail for nesting cooperation with the rear edge of the bed is, however, optional.

This construction of the bed 22 is explained in greater detail in U.S. Pat. Nos. 5,188,418, 5,544,932, 5,730,486, 5,938,272, 6,128,815 and 6,170,905 all owned by the Assignee hereof.

Figure 7:
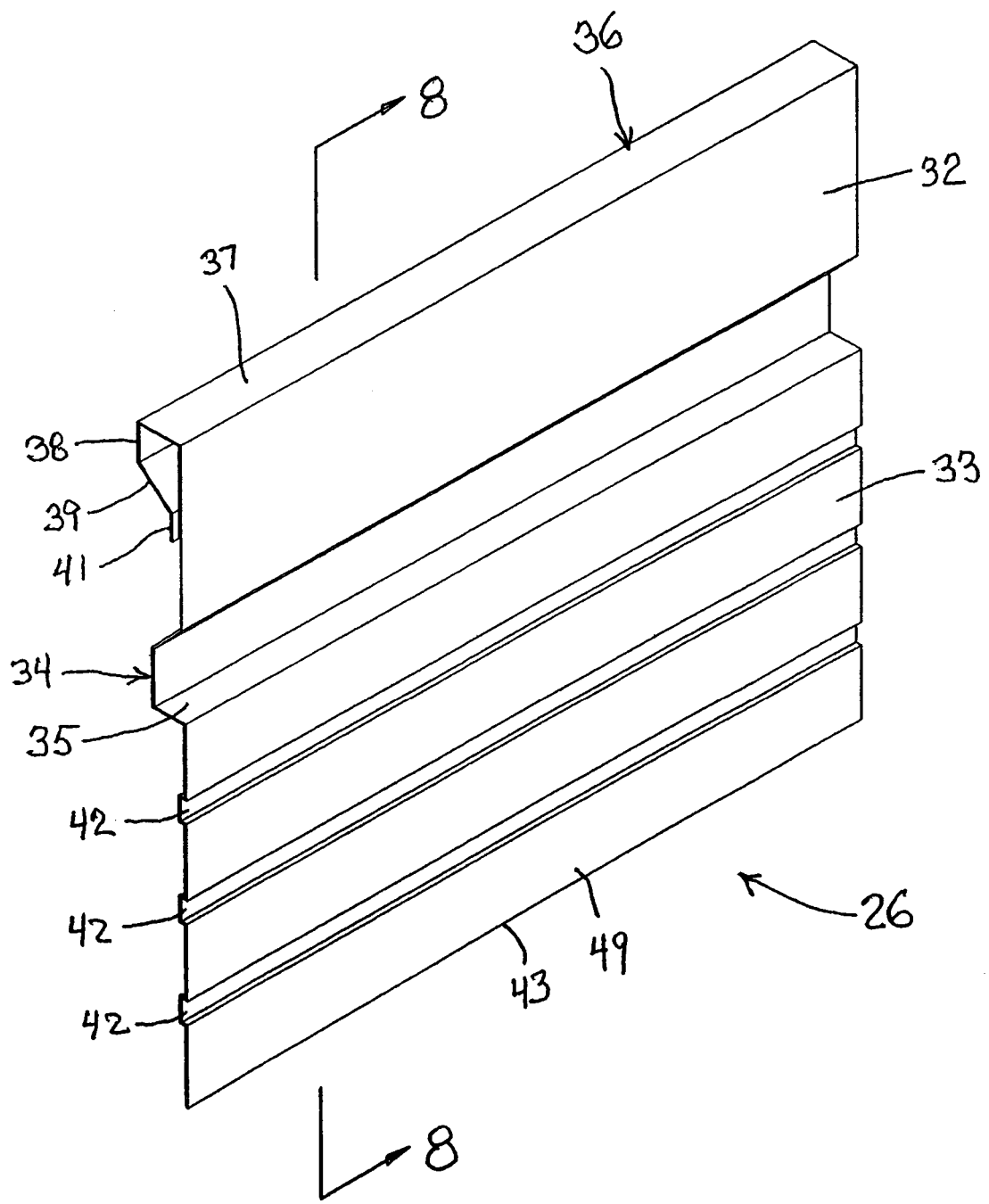
FIG. 7 is an enlarged perspective view of the upright front panel associated with the box assembly of FIG. 5-6.
Figure 8:
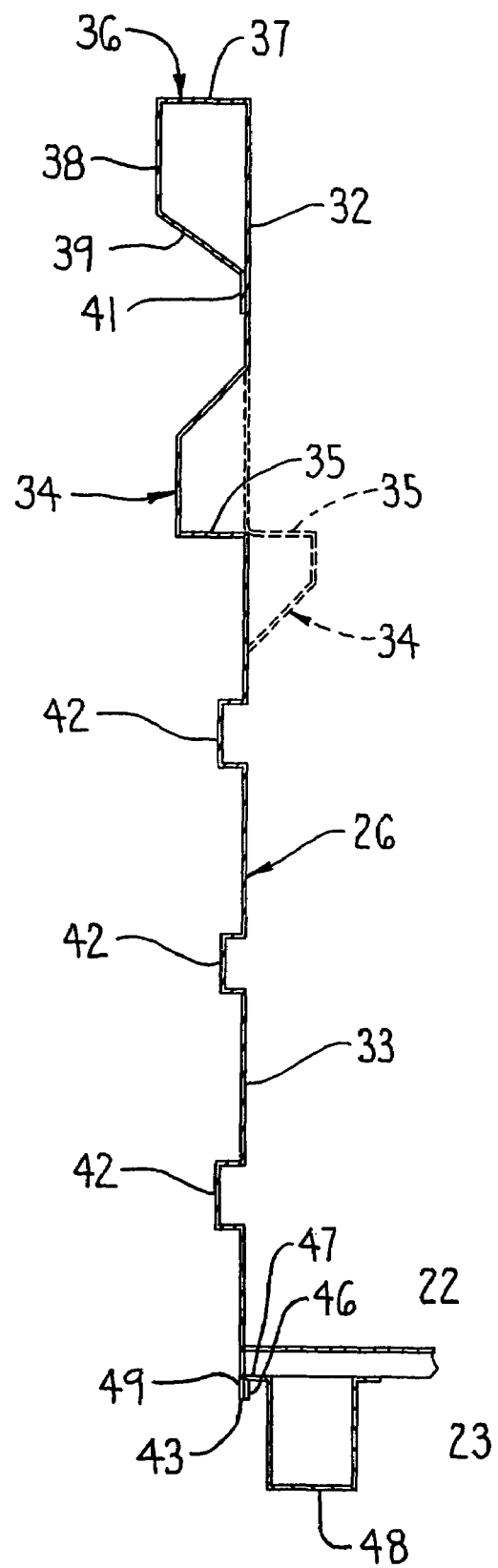
FIG. 8 is a cross-sectional view of the front panel as taken generally along line 8-8 in FIG. 7.

Considering now the upright front panel 26, and referring specifically to FIGS. 7-8, this panel in the illustrated embodiment includes generally flat and coplanar top and bottom wall portions 32 and 33 respectively, which are vertically oriented. The top and bottom wall portions 32 and 33 are joined by an intermediate shelf portion 34 which extends longitudinally (i.e. lengthwise) of the front panel 26 in a generally horizontal orientation. This shelf portion 34 is formed generally as a U-shaped channel which protrudes outwardly (i.e. forwardly) away from the flat wall portions 32-33. The U-shaped channel defining the shelf portion 34 thus opens inwardly for communication with the interior of the box, and defines a generally horizontally-oriented bottom wall 35 which extends lengthwise across the complete width of the front panel 27 and functions as an upwardly-facing shelf.

Front panel 26 has a reinforcing rail 36 associated with and extending along the length of the upper edge thereof. This reinforcing rail 36 is channel shaped and is preferably formed as a generally closed tubular cross section defined by a top wall 37 which in the illustrated embodiment projects outwardly from the front panel 32, which top wall 37 is bent downwardly to define an outer wall 38 which is generally parallel with but spaced rearwardly from the front panel 32, and the outer wall 38 in turn joins to a bottom wall 39 which slopes downwardly toward the front panel 32. The bottom wall 39 terminates in an edge flange 41 which contacts and overlies the front panel 32 and is fixedly secured thereto, as by welding. In accordance with the present invention, a seam weld is preferably provided to fixedly join the flange 41 to the front wall 32, which seam weld extends lengthwise of the reinforcing rail 36 along the complete width of the front panel 26.

The lower wall portion 33 of the front panel 26 is preferably provided with a plurality, here three, of reinforcing channels or ribs or beads 42 formed therein, which ribs 42 are disposed in parallel and generally vertically spaced relationship, and are elongated horizontally so as to extend across the complete width of the front panel. The lower free edge 43 of the front panel 26, as defined by the lower edge of the lower wall portion 33, is disposed so as to be positioned slightly below the elevation of the bed 22 when the box assembly is assembled, whereby the lower part of the wall portion 33, adjacent the free edge 43, defines a flange 49 which overlaps and abuts against a down-turned flange 46 associated with the front cross rail 23. The latter has in the illustrated embodiment a hat-shaped cross section 48 which includes generally horizontal top flanges, the front flange 47 of which has the downturned flange 46 associated with the front edge thereof. The abutting and overlapping flanges 46 and 49, which extend across the width of the box, are suitably fixedly joined, preferably by welding, such as by a series of spot welds or by a seam weld extending lengthwise along the flanges.

With the arrangement illustrated by FIG. 8, the bed 22 is positioned on top of and fixedly secured, as by spot welding, to the flanges of the cross rail 23, and the front edge of the bed 22 can be positioned substantially to abut the front panel 26, with the area of contact therebetween being appropriately sealed in a conventional manner.

The front panel 26 of this invention is formed as a monolithic one-piece member which is roll-formed from sheet metal, preferably sheet steel, with the roll-forming of the front panel 26 occurring in the lengthwise direction thereof as illustrated in FIG. 7, which lengthwise direction extends generally horizontally in the widthwise or transverse direction of the assembled box assembly. The roll-forming of the front panel 26 enables the forming of the shelf portion 34, the reinforcing channels 42 and the closed tubular top rail 38, as well as the longitudinal seam welding of the top rail 38, to be easily and efficiently carried out as the sheet steel is being fed into and through a roll-forming line, prior to the individual front panels 26 being cut to the desired length.

Figure 9:
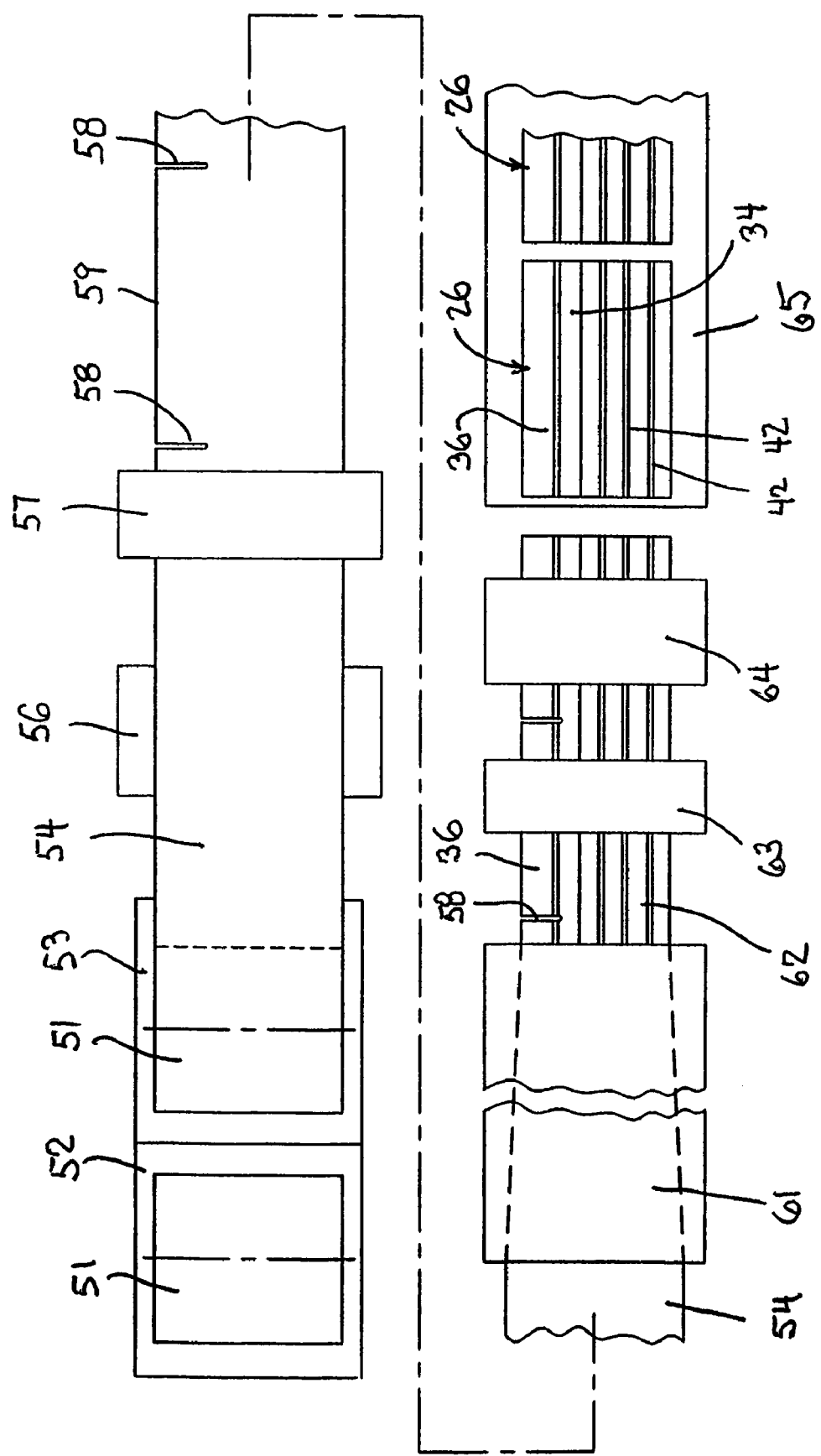
FIG. 9 is a flow diagram which diagrammatically illustrates the forming equipment and process utilized for roll-forming of a panel for a vehicle box assembly according to the present invention, which panel for example may comprise a front panel or a side panel.

The roll-forming of the front panel 26 is diagrammatically illustrated in FIG. 9. The steel sheet is normally supplied in the form of a large coil 51 as provided on a coil feed rack 52 which can be positioned adjacent a cradle 53 onto which the coil 52 can be transferred for support during the manufacturing operation. The cradle 53 has conventional structure associated therewith to effect straightening of the sheet material as it is discharged therefrom in the form of a substantially continuous metal sheet 54. The sheet material is fed through a combined end shear/welder 56 which trims the leading and trailing ends of each coil and welds the trimmed trailing end of one coil to the leading trimmed end of the next coil so as to permit a substantially continuous sheet 54 to be fed into and through the subsequent manufacturing stations.

After passing through the shear/welder 56, the continuous steel sheet 54 moves through a notcher or punch press 57 which, in this variation of the invention, forms a small slit or notch 58 which opens transversely inwardly from one side edge 59 of the sheet. The notches 58 are spaced apart lengthwise of the sheet 54 by a distance which generally corresponds to the desired cut length for individual panels. The length of the notches 58 (i.e., their transverse projection into the sheet) is selected so as to allow the portion of the sheet extending lengthwise between adjacent notches 58 to be subsequently roll-formed into the closed tubular top rail 36.

After passing through the notcher 57, the continuous notched sheet 54 progressively moves through a roll mill 61 which progressively reforms the steel sheet so that, while the steel sheet is substantially flat when entering the leading end of the roll mill 61, the steel sheet is suitably formed so as to have the finished cross section of the front panel 26 (as shown in FIG. 8) when leaving the discharge end of the mill 61. The progressive reforming of the steel sheet as it passes through the mill 61 is diagrammatically illustrated by the progressive decreasing width of the steel sheet as it moves longitudinally through the mill.

Upon leaving the roll mill 61 the continuous but deformed steel sheet 62 has the cross section of the front panel 26 substantially as illustrated by FIG. 8, and this continuous deformed steel sheet 62 is then fed into and through a seam welder 63 which effects creation of a continuous seam weld between the flange 41 and the top wall panel 32 so as to effect fixed closure of the tubular reinforcing rail 36, which rail extends along the edge of the deformed sheet 62 between the notches 58. In this respect the notch 58 is preferably initially sized such that the closed or blind end of the notch 58 is positioned adjacent and preferably just slightly past the lower free edge of the flange 41 after the reinforcing rail 36 has been roll-formed and welded in place.

The continuous metal sheet 62 is continuously fed from the welder 63 into and through a cut-off press 64 which cuts the deformed steel sheet 62 at desired spaced distances corresponding to the desired length of the finished front panel 26. In the present illustration this distance corresponds to the spacing between the notches 58, so that the cut-off occurs in alignment with the notch 58. Due to prior creation of the notch 58 and its extension through the reinforced top rail 36, the cut-off which takes place at the press 64 hence effectively occurs only through that portion of the deformed sheet 62 which is effectively of single thickness, namely that portion of the front panel 26 which extends downwardly from the flange 41 as illustrated in FIG. 8. The individually cut roll-formed panels 26 discharged from the cut-off press 64 can then be moved away from the press, such as by a conveyor 65, for subsequent handling as desired.

Figure 10:
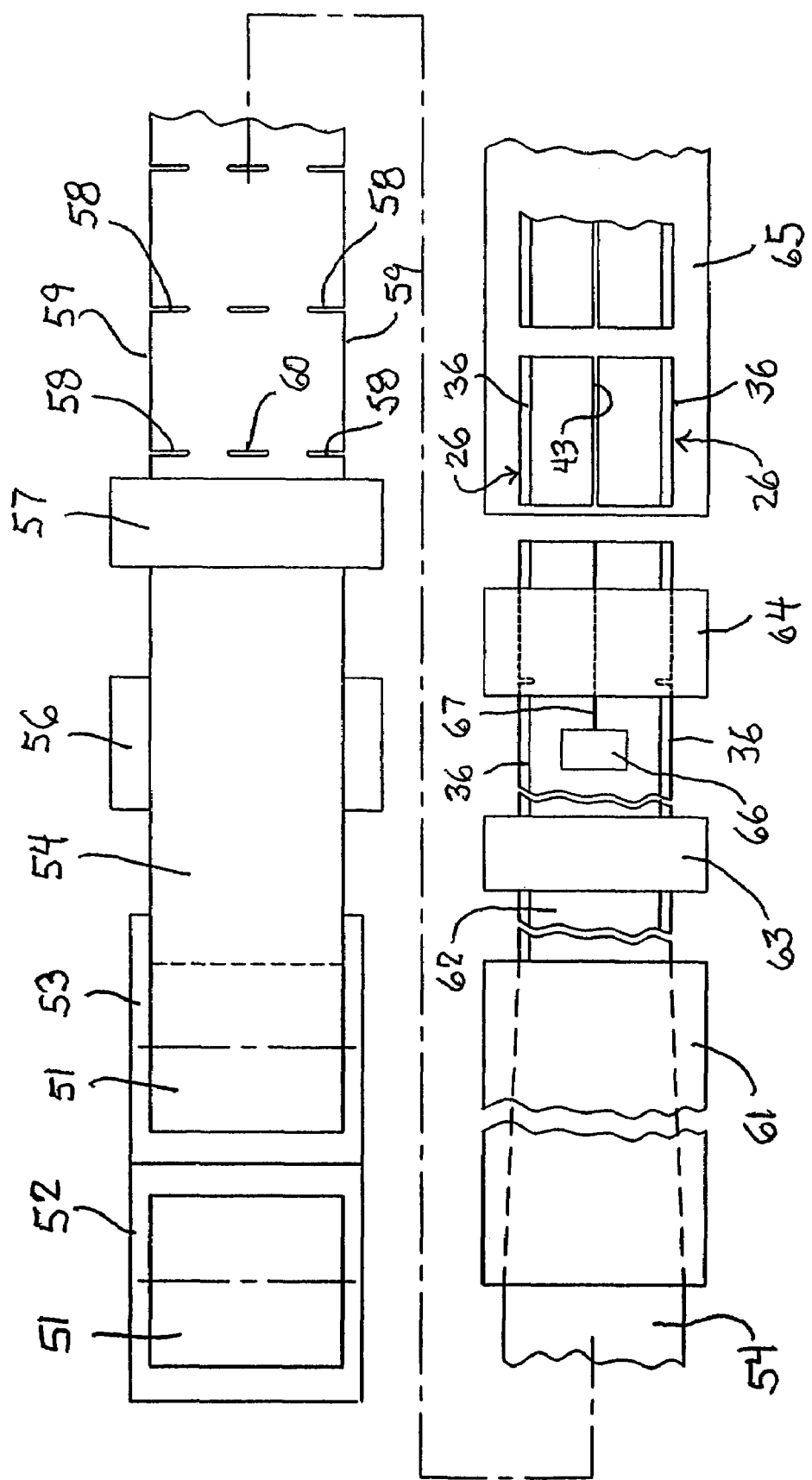
FIG. 10 is a flow diagram similar to FIG. 9, but which diagrammatically illustrates the simultaneous forming of two panels in side-by-side and mirror-image relationship, such as two side panels or two front panels, as the sheet steel is fed downstream along the roll forming line.

As an alternative and preferable roll-forming method, the present invention desirably permits a pair of identical front panels 26 to be simultaneously roll-formed in side-by-side relationship so as to permit more efficient and economical manufacture. Such side-by-side roll-forming of the front panel 26 is illustrated in FIG. 10 which generally corresponds to the process illustrated by FIG. 9, described above, except that the coil 51 utilized in the FIG. 10 process is necessarily of greater width so as to accommodate the simultaneous forming of two front panels 26 positioned sidewardly adjacent one another, with the front panels being disposed substantially as mirror images relative to the longitudinally extending centerline of the continuous sheet 54. In addition, the notcher 57 will form virtually identical and aligned notches 58 which project inwardly from both side edges 59 of the sheet, and the roll-former 61 will effectively progressively effect the desired reforming of the sheet 54 in a symmetrical manner relative to the longitudinally extending centerline of the sheet, with the end result being that reinforcing rails 36 are formed along the opposite sides of the sheet. Further, the seam welder 63 is effective for creating a pair of seam welds, one associated with each of the formed rails 36 and, after passing through the seam welder 63, the formed sheet then passes through a slitter 66 which, as illustrated, is disposed upstream of the cut-off press 64. The slitter 66 creates a continuous longitudinal cut line 67 generally along the centerline of the continuous sheet. The longitudinally slit sheet then passes through the press 64 which effects cutting of the continuous sheet at the desired length corresponding to the aligned pair of notches 58, and thence discharges a pair of finished front panels 26 in a side-by-side relationship.

It will be understood that the slitter 66 can be disposed downstream of the cut-off press 64 to effect longitudinal slitting of the cut-off panel member at a subsequent location or time if desired.

Figure 11:
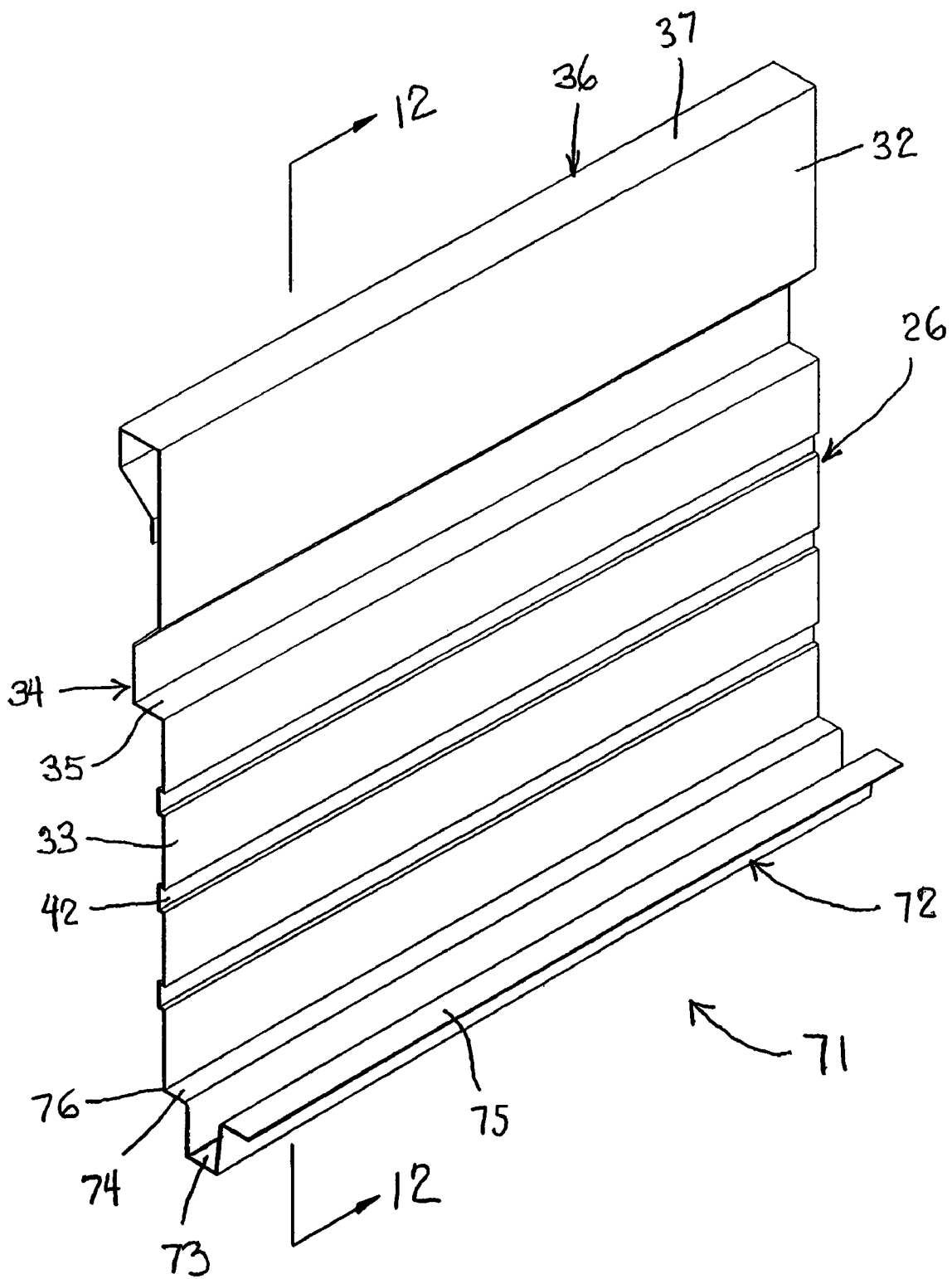
FIG. 11 is a perspective view similar to FIG. 7 but illustrating a modification of the upright front panel wherein the latter has the front cross rail integrally and monolithically roll-formed therewith.
Figure 12:
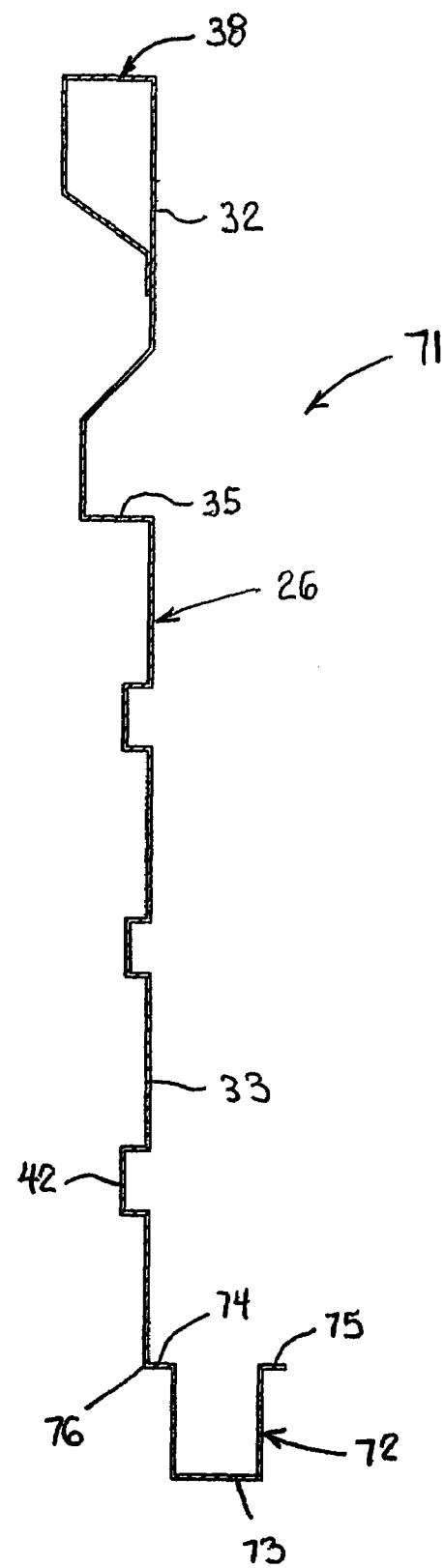
FIG. 12 is a cross-sectional view taken generally along line 12-12 in FIG. 11.

Referring now to FIGS. 11-12, there is illustrated a combined front panel and cross rail arrangement 71 which is formed as a one-piece monolithic roll-formed construction, and which provides a desirable replacement for the two-piece construction illustrated by FIG. 8. More specifically, the one-piece construction 71 includes a front panel 26 which is identical to the panel 26 shown in FIG. 7 as described above, and which in addition has a front cross rail 72 integrally and monolithically joined thereto. In this respect the front cross rail 72 as illustrated has a hat-shaped or channel-shaped cross section 73 provided with front and rear top flanges 74 and 75, respectively, which provides supportive contact with the underside of the floor or bed. In this construction, however, the front edge of the front flange 74 is integrally and monolithically joined at corner 76 to the lower edge of the lower wall portion 33 associated with the front panel 26. This one-piece construction 71 hence enables the conventional use of two separate pieces (i.e., a separate front panel and a separate front cross rail) to be replaced by a single piece, thereby facilitating the manufacture, handling and assembly, and accordingly improving overall box assembly economics.

Figure 13:
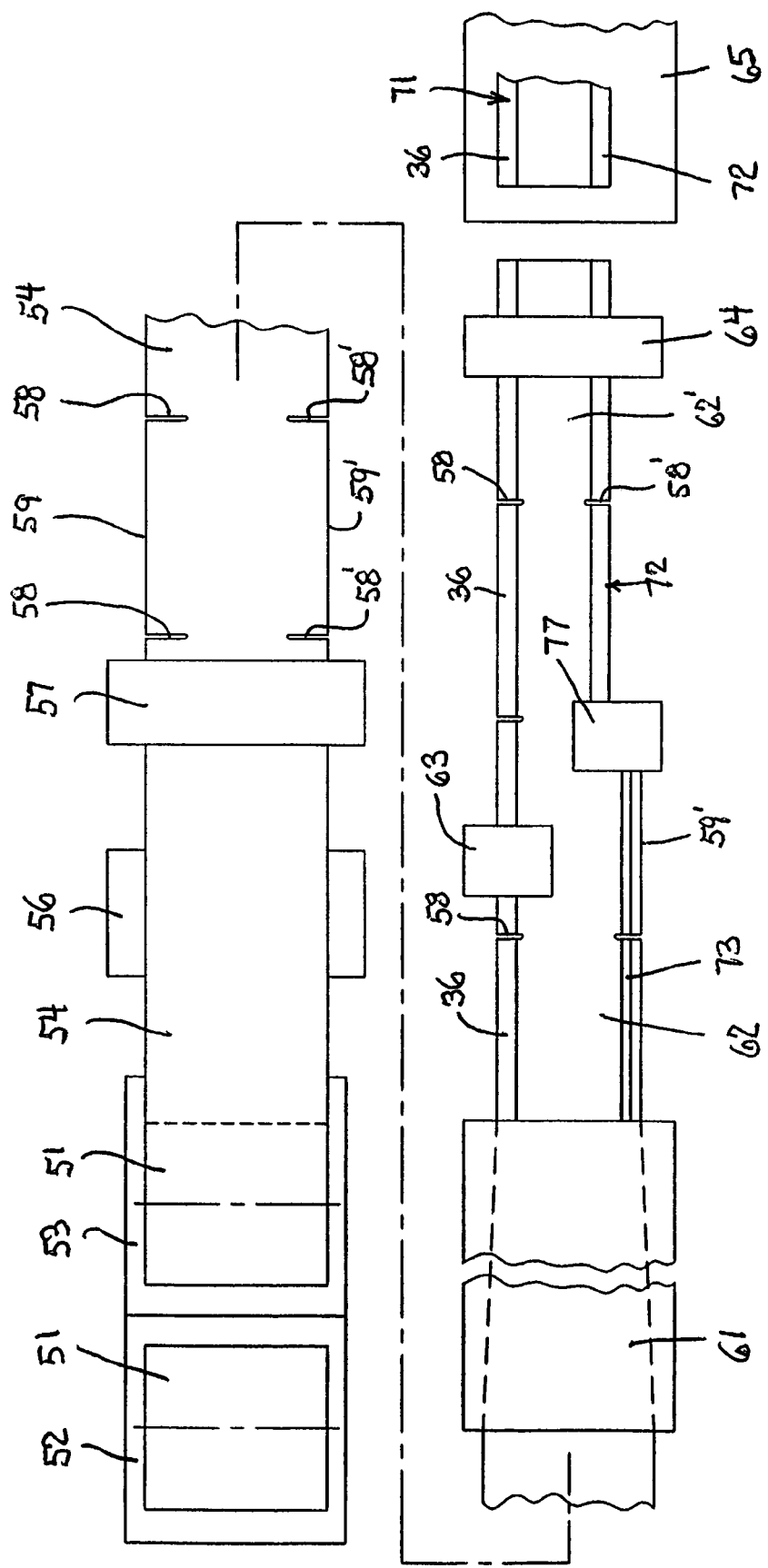
FIG. 13 is a further flow diagram similar to FIG. 9 but which diagrammatically illustrates a variation wherein the roll-formed panel has a significant lengthwise-extending part thereof rolled or formed upwardly in substantially perpendicular relationship to the main portion of the roll-formed panel, such as for forming a front panel of the type illustrated by FIG. 11 or an integrated side/floor panel of the type illustrated by FIG. 22.

The one-piece front panel/cross rail construction 71 is preferably formed by roll-forming, and such is diagrammatically illustrated in FIG. 13 which generally corresponds to the process depicted in FIG. 9 described above, but which is modified so as to permit the cross rail 72 to be roll-formed as an integral and monolithic part of the roll-formed front panel 26.

In the arrangement diagrammatically depicted in FIG. 13, the front panel 26 of the one-piece construction 71 is roll-formed in a manner identical to that as described with respect to FIG. 9 above. However, the sheet 54 as fed into and through the notcher 57 is also provided with slots or notches 58' which open inwardly from the opposite side edge 59', which notches 58' are longitudinally spaced apart and generally transversely aligned with the opposed notches 58. The notches 58' have a length which is sized so as to compensate for the width of sheet material defining the cross rail 72. During feeding of the notched sheet 54 into and through the roll-former 61, the roll-former effects progressive roll-forming of the flat sheet 54 so as to create the desired configuration of the center portion of the sheet and with the edge portions of the sheet being suitably roll-formed so as to define the reinforcing rail 36 along one edge 59 and the cross rail 72 along the other edge 59'. The formed sheet 62 exiting the roll-former 61 can again pass through the welder 63 which effects seam welding along the reinforcing rail 36 as described above, and in addition the cross rail section 72 which extends along the other longitudinal edge of the formed sheet can be fed into a former 77 which effects creation of the corner 76 so that the cross rail 72 hence extends generally perpendicularly with respect to the front panel 26. The former 77 may constitute either a bending press or a roll-former, and if the latter, then such can be incorporated as a part of the principal roll-former 61.

The deformed sheet 62' is fed into the cut-off press 64 then cuts the deformed sheet 62' into the desired lengths, which cut occurs generally along the line defined by the aligned notches 58 and 58', thereby defining the finished roll-formed member 71. The presence of the notches 58 and 58' hence permits the cut-off at the press 64 to occur principally through only the single thickness of the panel 26, and hence does not require cutting through either the top rail 36 or the cross rail 72.

While the invention as illustrated and described above relates to the use of cross rails having a generally channel or hat-shaped cross section, it will be appreciated that other known cross rail configurations, such as Z-shaped or C-shaped cross rails, can also be utilized and will perform in generally the same manner as described above. For example, the cross rail 72 roll-formed as an integral part of the front panel 26 can be Z- or C-shaped in cross section, with the top leg of the Z or C having its free edge joined at the corner 76.

The integrated one-piece side panel/cross rail construction 71 of FIGS. 11-12 can also be roll formed with a pair of identical such panels being simultaneously formed and positioned in side-by-side relationship, substantially as described above relative to FIG. 10. When roll-formed in this side-by-side relationship, the cross rails 72 will preferably be positioned innermost of the sheet so as to be disposed generally directly adjacent and on opposite sides of the longitudinally extending centerline of the sheet. In addition, as illustrated in FIG. 10, a further elongate notch 60 projecting outwardly from opposite sides of the sheet centerline will preferably be aligned with each pair of side notches 58, which notch 60 will extend transversely on opposite sides of the centerline by a distance so as to project up to a point at or slightly past the corner 76. The feeding of the steel sheet through the main roll former results in the forming of the two side-by-side panels 26 with the channels 72 being generally coplanar with the panels 26. The roll-formed sheet is then severed longitudinally along the centerline by the slitter, and then passes through a subsequent rolling stage, such as depicted at 77 in FIG. 13, which will effect rolling so as to effect creation of the corners 76 so that the cross channels 72 both protrude upwardly in generally perpendicular relation relative to the adjacent panels 26. Thereafter the rolled sheet passes through the cut-off press which effects transverse cutting of the remainder of the sheet which extends between the side notches 58 and the center notch 60.

Alternately, the side-by-side roll forming of two one-piece side panel/cross rail members 71, as described above, can effect longitudinal severing of the roll-formed sheet at the slitter, followed by transverse cutting at the cut-off press, with the individual panel members then being sent to a bending press to effect creation of the corner 76 so that the cross rail protrudes perpendicularly from the front panel.

While the roll-formed front panel 26 is illustrated in FIGS. 8 and 12 with the shelf portion 34 roll formed so as to protrude outwardly from the base sheet, it will be understood that this shelf portion 34 can also be roll-formed so as to protrude inwardly as illustrated by the dotted line showing in FIG. 8.

In addition, the top rail 36 associated with the front panel 26 can also be roll-formed so as to protrude inwardly relative to the base sheet, rather than outwardly as shown in FIGS. 8 and 12, such choice being a matter of overall roll-forming and vehicle box design.

Figure 14:
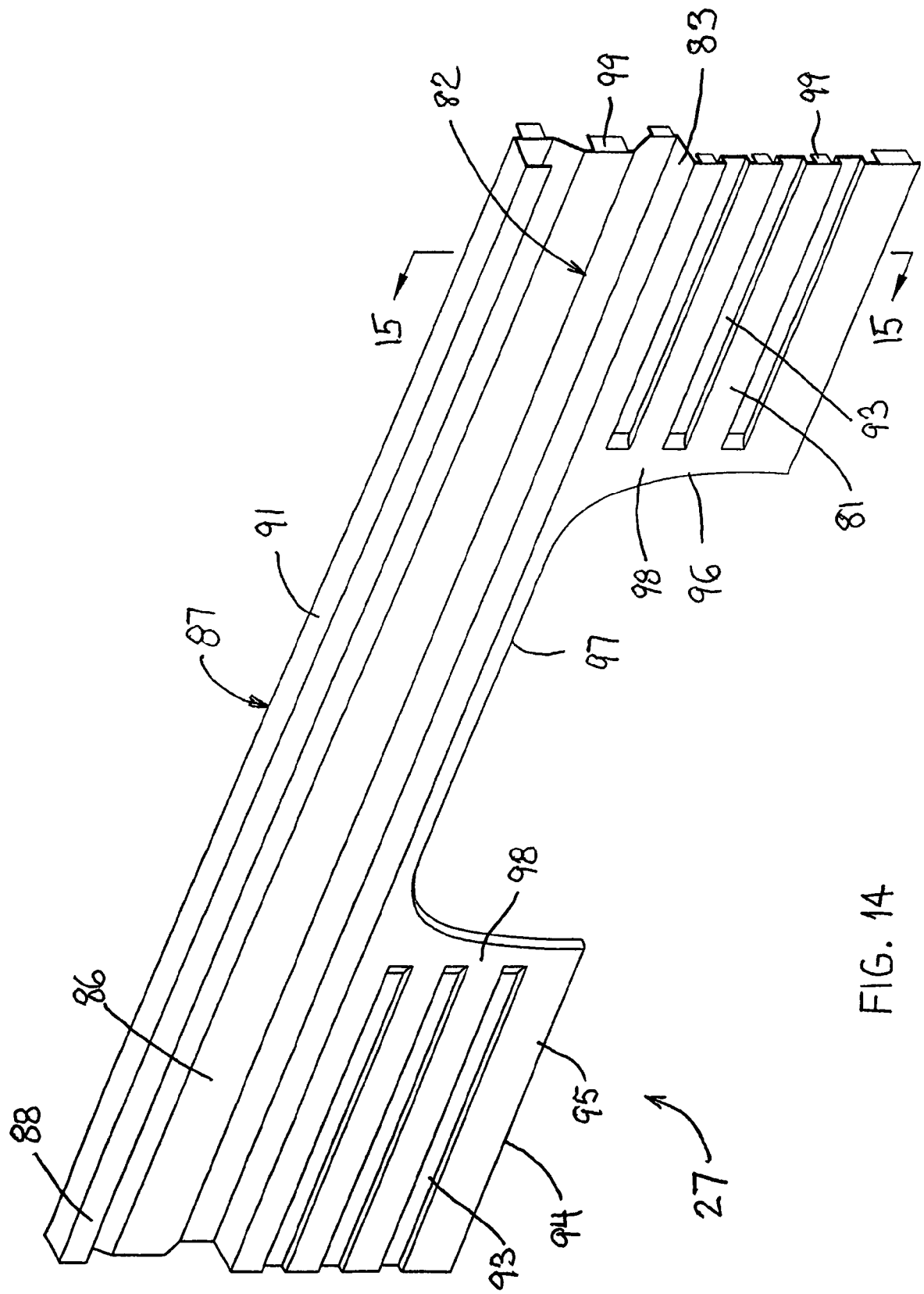
FIG. 14 is a perspective view of the upright side panel associated with the box assembly of FIGS. 5-6.

Considering now the inner upright side panel 27 (FIGS. 5-6) of the box assembly 21, this side panel 27 is also preferably formed as a monolithic one-piece member which is roll-formed in the lengthwise or longitudinal direction (i.e., the front-to-back direction of the assembled box). The construction of the roll-formed side panel 27 is explained below with reference to FIGS. 14 and 15.

The side panel 27 includes a main, generally flat, upright wall portion 81 which extends generally vertically and joins to a longitudinally-extending shelf portion 82 which is deformed outwardly relative to the wall portion 81. Shelf portion 82 as illustrated by FIG. 15 has a generally inwardly-opening channel-shaped cross section including a generally horizontal bottom wall 83, the upper surface of which functions as a shelf. Bottom wall 83 in turn joins to an upright rear wall 84, the latter joining to an inwardly sloped top wall 85. A generally vertically oriented intermediate side wall portion 86 projects upwardly from the sloped top wall 85, and a top reinforcing rail or channel 87 is spaced upwardly from the shelf 83 and is joined to the upper edge of the intermediate wall portion 86 and extends lengthwise along the upper extremity of the side panel 27.

The top reinforcing channel 87 is defined by generally parallel and spaced inner and outer upright side walls 88 and 89 respectively, which are joined by a top wall 91 extending therebetween. The lower edge of outer side wall 89 joins to an inwardly sloped bottom wall 92 which in turn joins to an upper edge of the intermediate side wall portion 86. The illustrated construction results in the wall portions 85, 86 and 92 defining a shallow outwardly-opening channel cross section which extends generally vertically between the top rail 87 and the shelf portion 82. In addition, the top rail 87 has a generally downwardly opening U- or channel-shaped cross section, such open channel shape being conventionally associated with the inner side panel of the bed assembly. If desired, the top rail 87 can, as illustrated in FIG. 15A, be roll-formed so as to protrude outwardly relative to the bed, and/or formed as a closed hollow tube such as associated with the front panel 26 as described above.

Side panel 27 is preferably provided with a plurality, here three, of reinforcing ribs or channels 93 which are deformed outwardly (or inwardly if desired) from the main wall portion 81. The channels 93 extend lengthwise (i.e. horizontally) throughout the length of the panel 81 and are disposed in generally parallel and vertically spaced relationship. The panel 81 terminates in a lower lengthwise-extending free edge 94, with the lower portion of the panel 91 in the vicinity of the free edge 94 functioning generally as a securing flange 95 for permitting fixed securement, as by welding, to an adjacent flange associated with the floor or bed 22.

The panel assembly 27 also has a conventional wheel well opening 96 formed therein, which wheel well opening opens upwardly from the lower free edge 94. The upper edge 97 of the wheel well opening is preferably disposed at an elevation which is disposed at least slightly downwardly from the horizontal shelf 83 so that shelf 83 will normally be at least slightly higher than the top of the adjacent wheel well housing. The wheel well opening 96 is preferably surrounded by a flat edge region 98 which is effectively defined by the exposed face of the flat side wall 81, and which requires flattening of the reinforcing channels 93 over a small distance extending away from the edge of the wheel well opening 96. The edge of the wheel well opening can be provided with securing flanges (not shown) bent transversely outwardly (i.e. toward the outer vehicle skin), if necessary or desired, for welded attachment to the wheel well cover. The opposite ends of the side panel 27 are also preferably provided with a plurality of flanges 99 which are bent to project transversely outwardly so that the front flanges provide securement to the front panel 26 and to the front filler panel in a conventional manner, and the rear flanges permit securement to the rear upright.

The side panel 27 is preferably longitudinally roll-formed as a one-piece monolithic member utilizing a roll-forming process which substantially corresponds to that utilized for roll-forming the front panel 26, as diagrammatically illustrated in FIG. 9. In roll-forming the side panel 27, however, the notches 58 (FIG. 9) formed in the continuous sheet for defining the length of the finished side panel 27 will normally be of greater width so that, when the panels are transversely cut and separated from the continuous sheet, the end edges of the panel will have sufficient excess length so as to permit a subsequent cutting and/or trimming and/or forming operation to be carried out thereon to permit creation of the securing flanges 99. In addition, after the panels 27 have been cut to length and discharged from the cut-off press associated with the roll-former, the roll-formed panels will then be subsequently processed so as to permit creation of the wheel well opening 96 and formation of the flattened edge region 98. These operations can be carried out in one or more stamping and pressing stations which will preferably permit the edge region 98 to be initially created by flattening of the reinforcing channels 93 over the desired length, followed by cutting out of the wheel well opening 96, which cut-out will typically be shaped and sized so as to permit forming of wheel-well-housing attaching flanges if desired.

With the roll-forming of the side panel 27 and its being cut-to-length prior to forming of the wheel well opening therein, it will be appreciated that the same roll-formed member can be used to permit forming of both the right and left side panels, and that the length can be varied by suitable adjustment of the forming line so as to permit forming of side panels suitable for different-length boxes.

In addition, the side panel 27 and specifically the roll-forming thereof can also be carried out so as to permit the simultaneous roll-forming of two side-by-side panels utilizing the same process illustrated and explained above with respect to FIG. 10.

Figure 16:
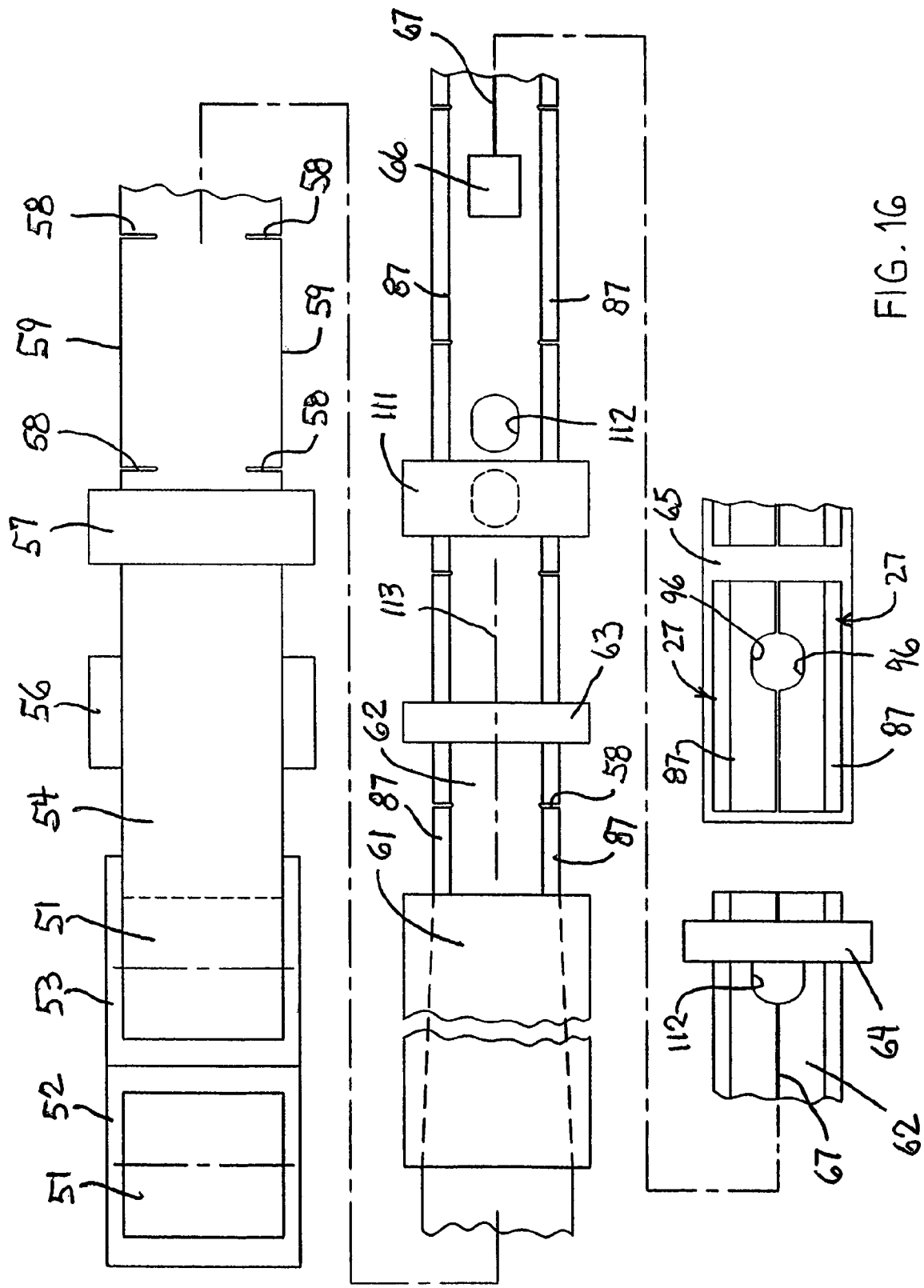
FIG. 16 is a further flow diagram which diagrammatically illustrates the roll-forming of two side-by-side and mirror-image side panels from a single width of steel sheet, including the forming of the wheel well openings and the slitting of the sheet to define the two side-by-side panels.

As a further alternative, the simultaneous roll-forming of a pair of side-by-side side panels 27 can also be carried out by the process diagrammatically illustrated in FIG. 16 which utilizes many of the same reference numerals utilized in FIG. 10 for designating the corresponding parts.

More specifically, the roll-former 61 in FIG. 16 progressively deforms the flat continuous sheet 54 such that the deformed sheet 62 departing the roll former has a configuration corresponding to a pair of side-by-side oriented side panels 27 disposed with their lower free edges 94 extending generally along the longitudinal centerline 113 of the formed sheet 62. The welder 63 can be provided if any closed welding of the top rail 87 is desired, or can be eliminated if an open top rail is provided. The formed sheet 62 can then be fed into and through a stamping press 111, which press can be of a multiple stage construction so that it effects punching out of a large opening 112 which is positioned generally symmetrical with respect to the longitudinal centerline 113 of the formed sheet 62, which opening 112 on opposite sides of the centerline creates formation of an opening corresponding to the wheel well 96 which is to be formed in each side panel. The press 111 can also effect flattening of the reinforcing channels 93 adjacent the edges of the opening, and the forming of additional edge flanges at the opening if desired. The opening 112 is obviously formed at the desired location with respect to the programmed length of the side panels, and at programmed lengths corresponding to the individual side panels.

Following forming of the opening 112 in the formed sheet 62 and the movement of the sheet 62 away from the forming press 111, the sheet 62 is then fed through the slitter 66 which creates a longitudinal cut generally along the centerline 113 so as to effect a separation of the formed sheet 62. The longitudinally slit sheet 62 is then fed into the cut-off press 64 which effects the desired transverse cutting of the formed sheet, such as generally in alignment with each opposed pair of notches 58, whereby a pair of roll-formed side panels 27 having wheel well openings formed therein are thus discharged from the cut-off press. In this situation the side-by-side forming of a pair of side panels 27 which are effectively mirror images of one another hence automatically creates the desired right and left side panels for the box assembly.

As a preferred alternative to the process of FIG. 16 as described above, the wheel well openings can be formed in the panels 27 by a conventional stamping press after the panels are cut to length. The stamping of the wheel well openings can also be carried out on the cut-to-length sheet either before or after it has been slit longitudinally.

Figure 17:
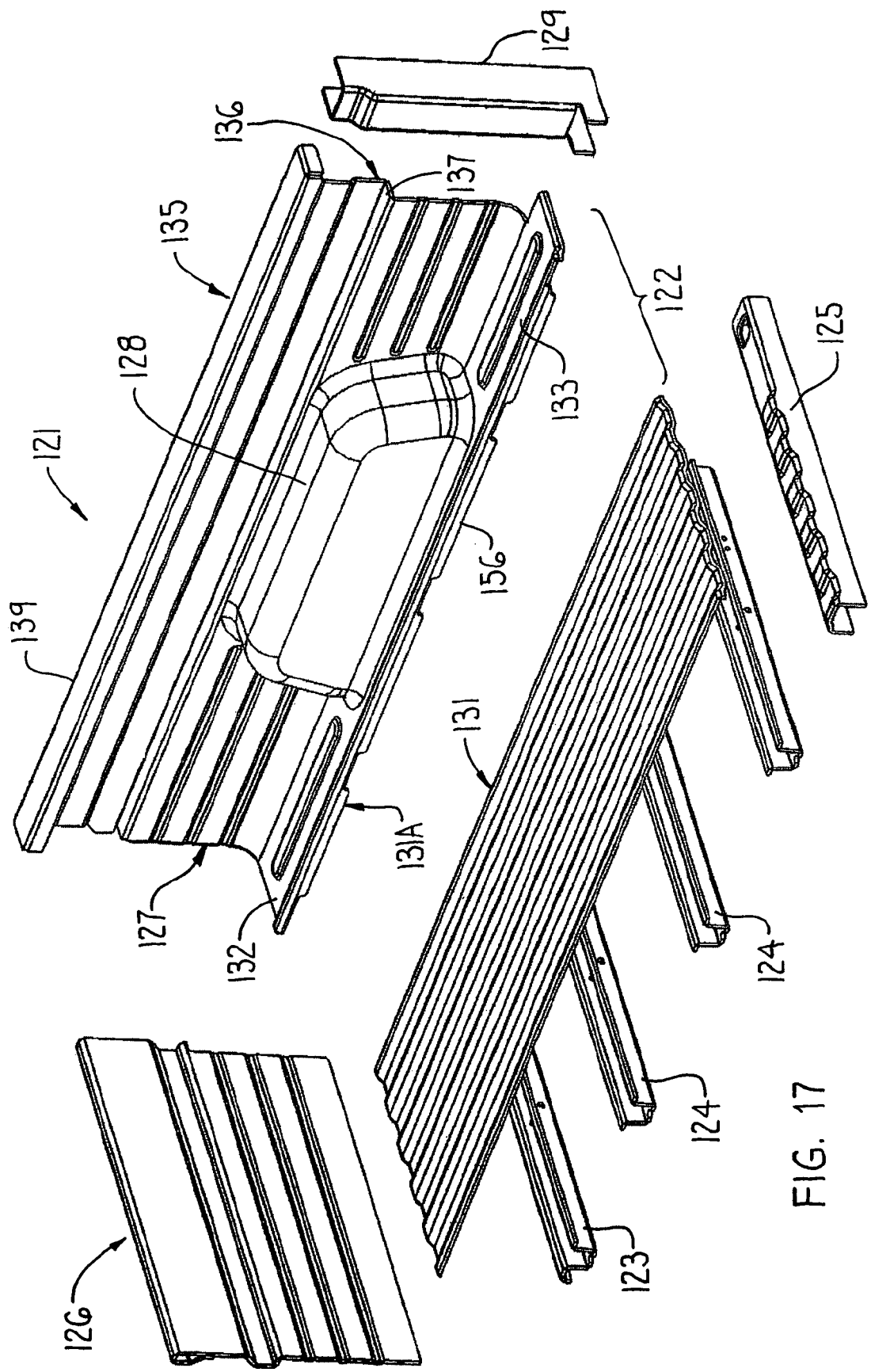
FIG. 17 is an exploded perspective view showing individual parts associated with an improved vehicle box assembly according to a second embodiment of the invention.
Figure 18:
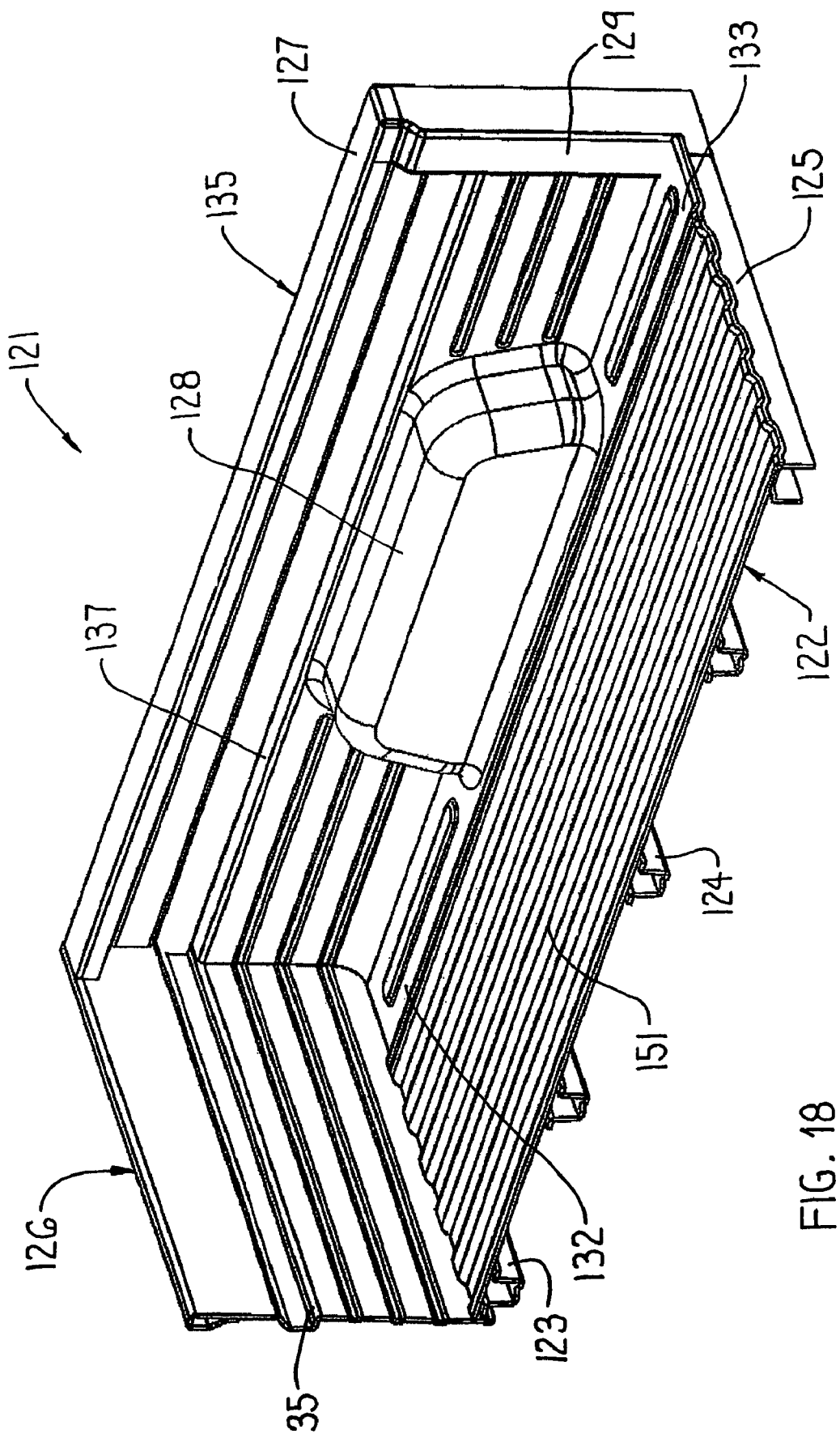
FIG. 18 is a fragmentary perspective view illustrating the parts of FIG. 17 in the assembled condition.

Referring now to FIGS. 17-18, there is illustrated a second embodiment of a box assembly 121, particularly for a pickup truck, according to the present invention.

The box assembly 121 again includes a floor or bed 122 supported on a plurality of underlying cross rails such as a front rail 123, plural intermediate rails 124 and a rear rail 125. An upright front panel 126 projects upwardly adjacent a front edge of the bed 122, and a side panel 127 projects upwardly adjacent each side of the bed, with a wheel well housing 128 cooperating between each side panel 127 and the respective side portion of the bed 122. The rear edge of the side panel cooperates with an upright or post 129.

In the box assembly 121, the bed 122 is defined by multiple bed sections, including a main center bed section 131 which extends lengthwise throughout the full length of the bed but has a width which is sized so as to extend generally only between the wheel wells, whereby the center bed section 131 has a generally rectangular profile in plan view. The opposite sides of the bed are in turn completed by side bed sections 131A, with each section 131A being defined primarily by front and rear side bed portions 132 and 133, respectively, which are disposed respectively forwardly and rearwardly of the wheel well cover 128, and extend sidewardly from the side panel or wall 127 to the center bed section 131.

Figure 3:
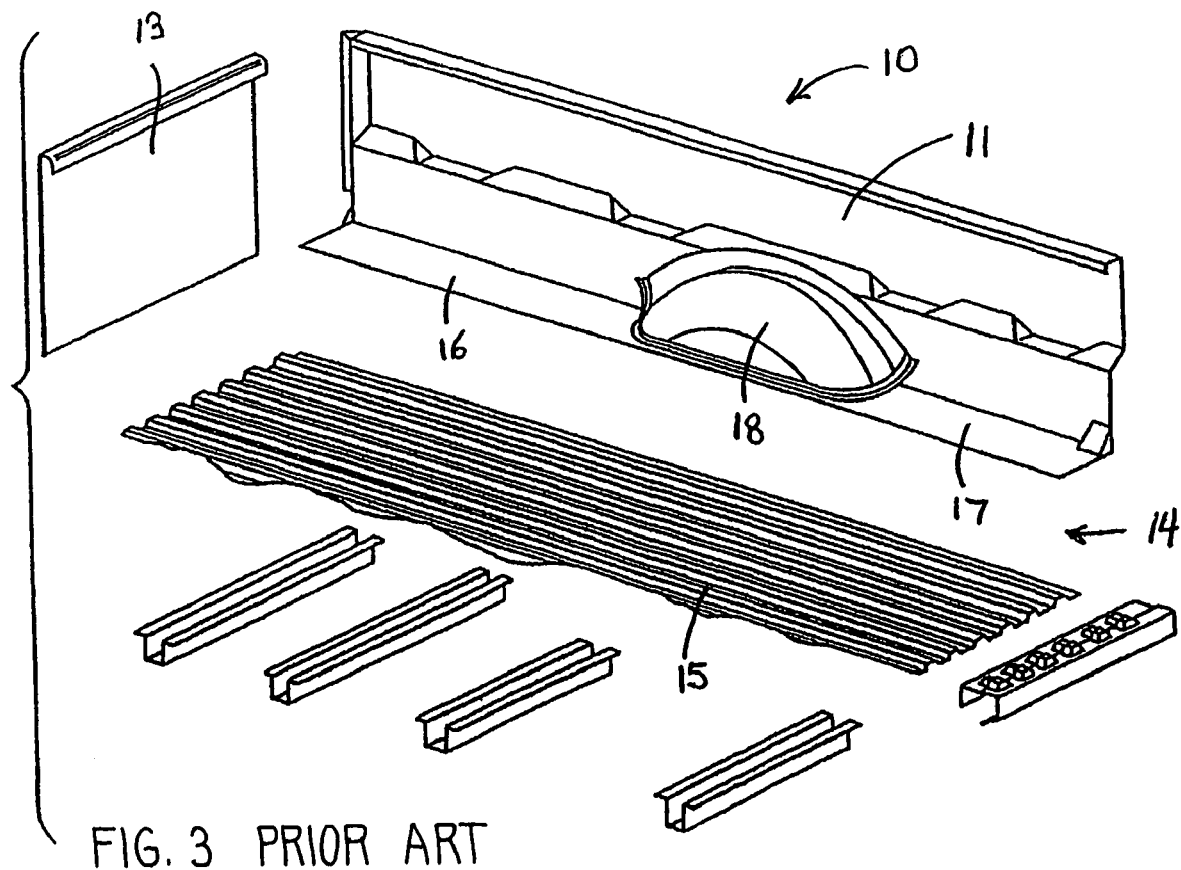
FIG. 3 is an exploded view of a box assembly corresponding generally to FIG. 1 but illustrating a known variation of the bed assembly.

In this variation of the box assembly, the side panel 127, the wheel well cover 128 and the bed panel section 131A may be formed as a monolithic one-piece construction 135 which is conventionally referred to as an inner quarter panel, which one-piece construction 135 can be formed as a stamped member. Such stamped inner quarter panel, as depicted by FIG. 3, is known. In the present invention, however, this one-piece inner quarter panel 135 is also preferably provided with a shelf portion 136 formed therein at a location directly above the wheel well cover 128, but downwardly of the top reinforcing rail or channel 139. The shelf portion 136 defines a generally flat bottom wall 137 which faces upwardly and extends horizontally throughout the length of the side panel 127 so as to effectively merge with a similar horizontal shelf 35 which is associated with the front panel 126.

As to the front panel 126, it is preferably a monolithic one-piece roll-formed panel which is identical to either the panel 26 (FIGS. 7-8) or panel 71 (FIGS. 11-12) described above, whereby further description thereof is believed unnecessary.

With respect to the center bed panel 131, it is preferably defined by a monolithic one-piece member which is roll-formed in a longitudinal direction from sheet steel. The bed member 131, in transverse cross section, is defined by a plurality of generally parallel and sidewardly spaced raised channels or ribs 141 (FIGS. 19-20) which alternate with intermediate valleys or depressions 142. Each raised channel 141 is defined by a generally flat top wall which joins through downwardly sloped and appropriately rounded side walls 144 to generally flat base walls 145 which define the bottoms of the valleys or depressions 142. The base walls 145 are adapted to be supportingly engaged on and fixedly joined, as by spot welding, to the top flanges associated with the underlying support or cross rails 123-125.

Figure 19:
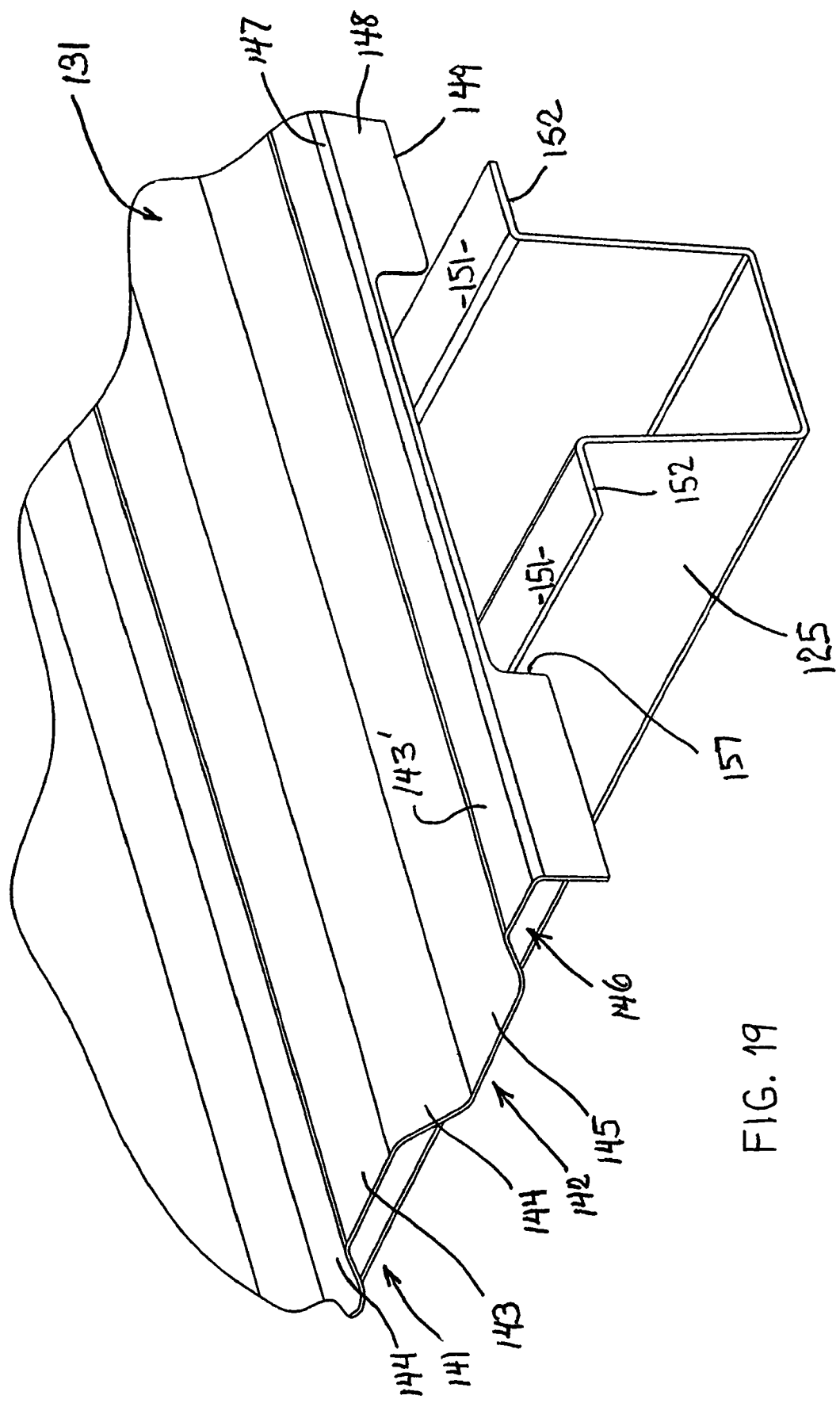
FIG. 19 is a fragmentary perspective view illustrating improvements associated with the center floor pan which can be utilized in conjunction with the embodiments of FIGS. 17-18 and FIG. 22.
Figure 20:
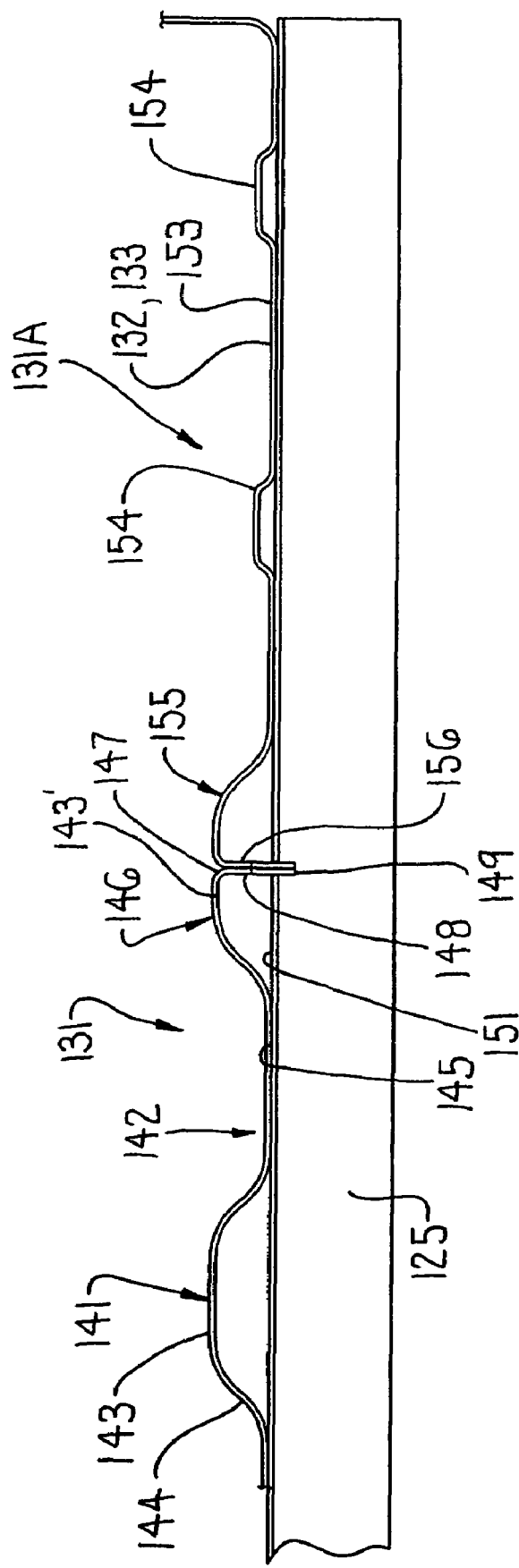
FIG. 20 is a fragmentary end elevational view illustrating the manner in which the roll-formed center pan of FIG. 19 cooperates with a side pan or bed member.
Figure 21:
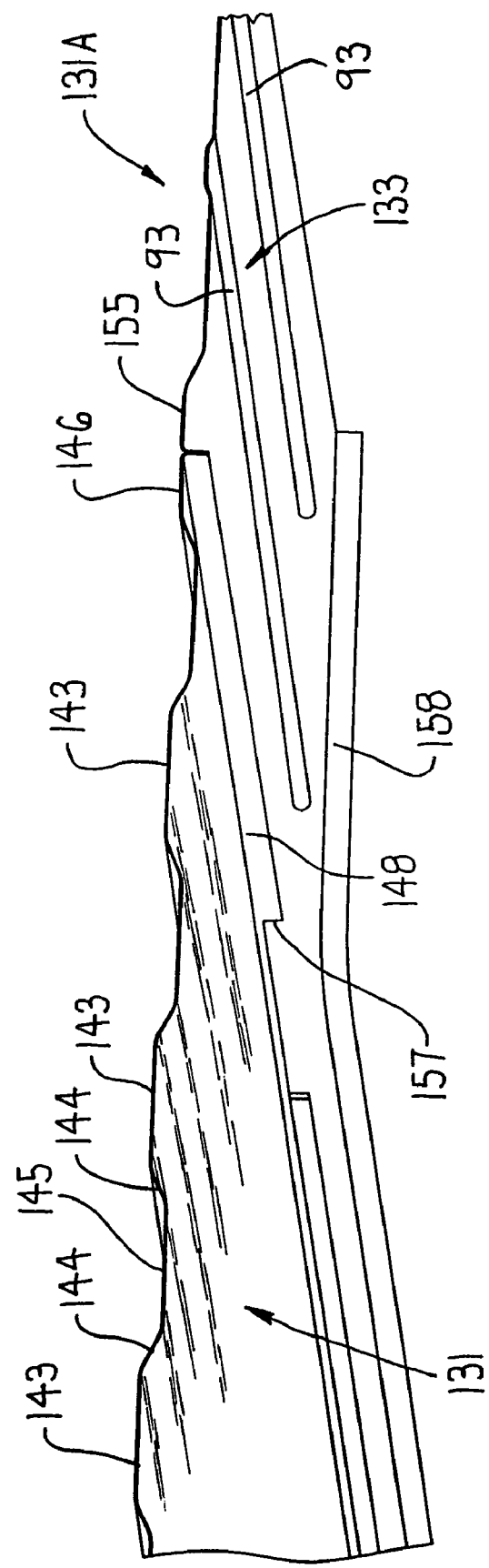
FIG. 21 is a fragmentary perspective view, taken generally from one edge and viewed from below, of the bed arrangement illustrated in FIGS. 19-20.

As illustrated by FIGS. 19-21, the center bed panel 131, along each of the longitudinally extending side edges thereof, is provided with a roll-formed edge channel 146 which in shape and size generally corresponds to one of the raised channels 141 except that the edge channel 146 effectively constitutes only one-half of one of the channels 141. The top wall 143' of the edge channel 146, which top wall 143' is approximately one-half the width of the top wall 143, is provided with a tightly rounded corner or bend 147 which projects downwardly and joins to a downwardly cantilevered edge flange 148, the latter terminating at a lower free edge 149. The edge flange 148 projects downwardly in approximately perpendicular (i.e. vertical) relationship from the top wall 143', and the flange 148 has a height as measured from the top wall 143' to the bottom edge 149 which is substantially greater than the height defined between the upper surface of wall 143 and the lower surface of base 145. The significantly greater height of this flange 148 provides two functions in that it provides increased stiffening strength in the longitudinal direction of the bed member, particularly at the edge joint, and it also facilitates welding of this flange 148 to an adjacent similar flange 156 (FIG. 20) provided on the adjacent side bed portion 131A.

According to the present invention the flange 148 associated with each side of the center bed member 131, as well as each flange 156 associated with each side bed section 131A, is provided with an upwardly opening recess 157 (FIG. 19) formed therein at a location corresponding to each of the cross rails 123-125. The recess 157 is longitudinally elongated so as to comfortably accommodate therein the top flanges associated with the cross rail, as illustrated in FIG. 19, but at the same time the upward cut-out defined by the recess 157 preferably terminates short of the bend or corner 147 so as to permit at least a small downward extent of the flange 148 to remain and define the upper edge of the recess 157 and hence still provide some reinforcement for the edge of the bed member where it is positioned directly over the cross rail. The provision of the special half-width edge channel 146 and its downward flange 148, and the provision of the rail-accommodating recess 157 in the flange 148, hence provide for increased reinforcement of the edge of the center bed section 131, at the same time facilitating attachment to the adjacent side bed sections, and further eliminating the need to provide clearance recesses in the cross rails, the latter being a conventional practice.

As illustrated by FIG. 20, each side bed section 131A as associated with the one-piece inner quarter panel 135 is also preferably provided with an edge channel 155 formed along the inner longitudinally extending edge thereof, which edge channel 155 is formed during stamping of the inner quarter panel 135, but which in cross section generally correspond to the edge channel 146 associated with the center bed section 131. Thus, when assembled, the adjacent edge channels 146 and 155 as shown in FIG. 20 hence effectively provide a size and appearance generally similar to that associated with the channels 141 defined by the center bed section 131.

As illustrated by FIG. 21, the side bed section 131A associated with the inner quarter panel, such as depicted by the side bed section 133, can have a flange 158 associated therewith if desired in the event that the side and floor panel sections of the inner quarter panel are formed separately from the wheel well housing. The flange 158 can be used to effect welded securement to a separate wheel well housing.

The side bed section 131A, as shown in FIG. 20, also typically has one or more longitudinally-extending ribs or channels 154 formed thereon so as to reinforce the bed section.

Figure 22:
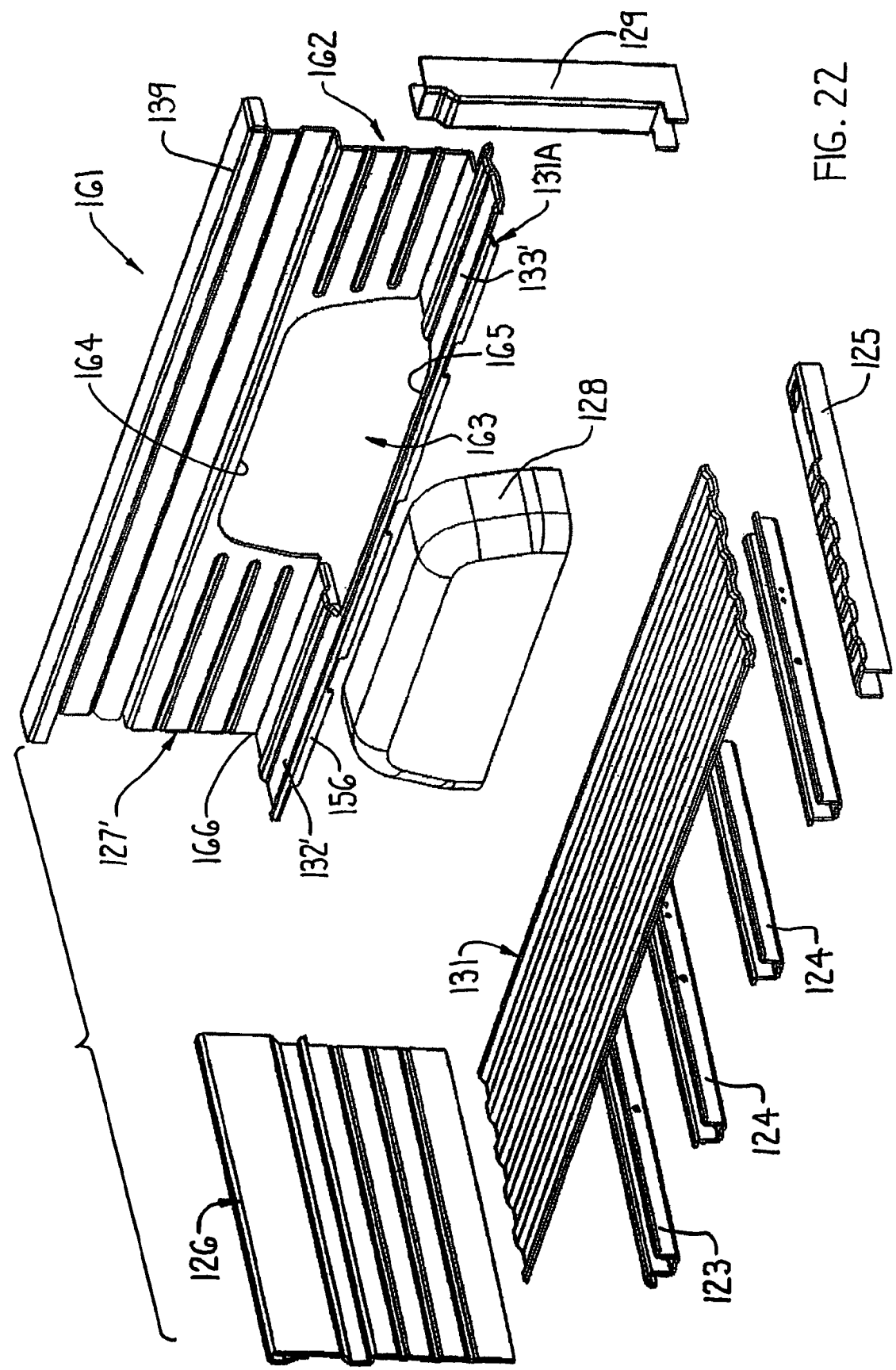
FIG. 22 is an exploded perspective view showing the parts associated with a vehicle box assembly according to a third embodiment of the invention.

A third embodiment of the invention is illustrated by FIG. 22. The vehicle box assembly 161 illustrated in exploded view in FIG. 22, when assembled, will have the same appearance as shown by FIG. 18. The box 161 of FIG. 22 utilizes many of the same constructional features utilized in the box assembly of FIGS. 17-18, and hence corresponding parts thereof are identified by the same reference numerals and will not be separately discussed.

The principal difference between the box assembly 161 of FIG. 22 and the box assembly 121 of FIGS. 17-18 is the fact that the box assembly 121 (FIGS. 17-18) utilizes a one-piece press-formed inner quarter panel 135 for defining side panel 127, wheel well housing 128 and side bed section 131A. In contrast, the box assembly 161 of FIG. 22 utilizes a two-piece construction for defining these same functional members, namely a monolithic one-piece roll-formed panel member 162 which defines both the side panel 127' and the side bed section 131A' (herein referred to as an integrated side/floor panel member), and a separate one-piece wheel well housing 128 which is typically of a one-piece stamped construction.

The upright side panel 127' defined by the roll-formed integrated panel member 162 is identical to the side panel 27 discussed above relative to FIGS. 14-15. The side bed section 131A' defined by the integrated panel member 162 is roll-formed in the longitudinal direction so as to be preferably provided with one or more upwardly projecting reinforcing ribs or channels extending longitudinally thereof, and is additionally provided with a downwardly-projecting securing flange 156 extending along the free edge thereof.

The one-piece roll-formed integrated panel member 162 can be roll-formed utilizing a process which substantially corresponds to that illustrated by FIG. 9 so as to permit roll-forming of the side panel 127' and the floor section 131A' as a generally continuous roll-formed flat sheet, which is then cut to the desired length, with the cut-to-length roll-formed panel then being subjected to a separate punching operation, such as in a stamping press, to effect forming of a wheel well opening 163 therein. The wheel well opening 163 will include a first portion 164 intended to project upwardly into the side wall portion 127, and a further opening portion 165 intended to project into the bed section 131A'. The stamping or pressing operation can also effect trimming of the end edges of the panel, and the forming of attachment flanges both at the end edges and at the wheel well opening. Preferably after forming of the opening 163, then the generally flat roll-formed integrated panel member 162 is then subjected to a further forming operation, such as in a bending press, to permit bending of the corner or bend 166 so as to cause the floor section 131A' to project in generally perpendicular relationship to the side panel 127'.

Alternatively, the roll-formed one-piece integrated panel member 162 can be roll-formed using a process similar to that illustrated by FIG. 13, with the notches 58 associated with one side edge of the continuous sheet 54 being sized to accommodate the reinforcing rail 139 along the upper edge of the side panel 127', and the notches 58' provided on the other edge of the sheet material 54 being sized to accommodate the width of the roll-formed bed section 131A'. The roll-formed sheet, in a generally flat condition, will hence exit the roll-former 61 (FIG. 13) and, at the bending or roll-forming device 77, the bed section 131A' can be bent or roll-formed upwardly to define the corner 166 and hence create a generally perpendicular relationship between the side panel 127' and the contiguous bed portion 131A'. When using this latter roll-forming process, then the opening 163 for the wheel well will preferably be stamped into the roll-formed panel member at an in-line station located downstream of the roll-former 61 but upstream of the former 77.

With the box assembly 161 illustrated by FIG. 22, all of the critical panels including the front panel, the side panel and the floor panels are all effectively roll-formed so as to provide economies with respect to material usage, finished box assembly weight, part manufacture, and assembly of the box. The wheel well housing 128 is the only principal stamped component, which component is welded in a conventional manner around the edges of the wheel well opening 163 formed in the shaped one-piece roll-formed integrated panel member 162.

When roll-forming panels for the box assembly in accordance with the present invention, it will be recognized that the width of the flat steel sheet, as provided in the coil, will substantially correspond to the width of the finished panel if flattened out into a planar condition, or the width of two such panels if two panels are simultaneously rolled in side-by-side relation, whereby trimming of the sheet or of the finished panel is generally unnecessary, and minimal usage of sheet material is achieved. Further, the roll-forming of the critical panels effectively eliminates or at least greatly minimizes stretching (i.e., thickness reduction) of the sheet during shaping of the panel, whereby a steel sheet of reduced thickness can hence be initially utilized to permit forming of the panel, particularly in comparison to stamped panels, and the resulting roll-formed panels are substantially of uniform thickness throughout. This hence minimizes the finished weight of the panel, reduces material costs, and greatly simplifies required tooling which significantly reduces tooling costs, and at the same time provides tooling having a significantly greater degree of flexibility. As to the actual design of the roll-former, it will be appreciated that the design of roll-formers involves the application of conventional techniques known to those of ordinary skill in the roll-forming art, whereby further description and explanation of the roll-former is believed unnecessary.

The roll-forming of the principal panels such as the side and front wall panels as well as the floor panels associated with the box assembly, as described above, is also advantageous inasmuch as this enables the panels to be more readily formed using high strength steel sheets, particularly steel sheets having a yield strength in the range of from 50,000 psi to about 100,000 psi. High strength steel sheets can be more readily shaped and deformed by roll-forming so as to provide panels having the desired three-dimensional contour, specifically permitting use of deeper draws or formations than is typical with stamping, thereby additionally providing design opportunity to utilize thinner materials and provide greater weight reduction while also providing more severe (i.e. deeper) three-dimensional shapes.

It will be appreciated that roll-formed panels for use in a truck box, such as disclosed herein, can be and typically are provided with various attachment flanges. For example, flanges are typically provided on the edge of either the front panel or the side panel for permitting securement at the front corners of the box assembly, on the rear edge of the side panel for securement to the rear post, and around the wheel well opening when a separate wheel well housing is utilized. Such flanges can be formed, trimmed and shaped as desired utilizing conventional pressing and shaping dies, whereby further detailed description relative to such flanges is believed unnecessary.

In the improved box assembly of this invention, the provision of the lengthwise shelf on the front panel, and the lengthwise shelves on the side panels, which front and side shelves horizontally align and communicate with one another at the front corners of the box, hence provide a support platform which extends around three sides of the bed at an elevation above the wheel well housings, but below the top rails of the front and side panels. This support platform hence can be used to permit attachment of a cover such as a tonneau cover or cap, or permit the ends of raised cross supports to be supported on the side shelves at any location therealong, or permit a horizontal divider platform (such as a plywood sheet) to be supported thereon so as to divide the cargo compartment of the box into upper and lower compartments.

When forming large openings in roll formed panels, such as wheel well openings in side panels as described above, it will be understood that the opening can be punched into the continuous sheet at a location upstream of the roll mill. Such punching operation, using either a flying die or a static die, effects formation of a developed opening, that is, an opening which is oversized to compensate for the subsequent deformation of the sheet during rolling. Forming the opening after roll forming, however, is normally preferred.

The shelf on the roll-formed front and side panels as described above, for example as illustrated by FIG. 8, can be formed so as to project in perpendicular relation to the vertical wall of the panel, thereby resulting in the upper support surface defined on the shelf being horizontal and hence free of any significant sideward slope, other than any small slope which may be desired for water run-off.

The overall assembly of the box utilizing the improved panels of this invention is, for the most part, conventional whereby further description thereof is believed unnecessary.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A pickup truck box assembly having a horizontally extending floor, a pair of inner upright side wall panels fixed relative to said floor adjacent opposite sides thereof and projecting upwardly therefrom, and an inner upright front wall panel fixed relative to said floor and projecting upwardly therefrom adjacent a front side thereof, the front wall panel having opposite ends thereof fixedly interconnected to respective front ends of said side wall panels, the front and side wall panels having generally coplanar upper edges, comprising the improvement wherein said front panel is a monolithic one-piece panel roll-formed from metal sheet and having a downwardly-oriented channel-shaped top rail roll-formed along an upper edge thereof, said front wall panel having a narrow upwardly-oriented shelf roll-formed in the monolithic one-piece panel and extending throughout the length of the front wall panel in generally parallel but spaced downwardly from said top rail, said shelf defining thereon a generally horizontal upwardly-facing support surface accessible from the interior of the box assembly.

2. A box assembly according to claim 1, wherein the top rail is an elongate closed tube.

3. A box assembly according to claim 1, wherein said front panel includes upper and lower upright panel portions which are substantially vertically coplanar and which are vertically joined by a U-shaped shelf structure roll-formed throughout the length of the front panel, said shelf structure being deformed horizontally from the panel in a direction away from the interior of the box assembly so that the interior of the U-shaped shelf structure opens into the interior of the box assembly and a lower wall of the shelf structure functions as said shelf, and wherein said top rail is roll-formed along the upper edge of said upper panel portion and is disposed in vertically spaced relationship above said shelf structure.

4. A pickup truck box assembly having a horizontally extending floor, a pair of inner upright side wall panels fixed relative to said floor adjacent opposite sides thereof and projecting upwardly therefrom, and an inner upright front wall panel fixed relative to said floor and projecting upwardly therefrom adjacent a front side thereof, the front wall panel having opposite ends thereof fixedly interconnected to respective front ends of said side wall panels, comprising the improvement wherein:

said front panel is a monolithic one-piece panel which is roll-formed from metal sheet and has a downwardly-oriented channel-shaped top rail roll-formed along substantially the entire upper edge thereof, and said front wall panel has a narrow upwardly-oriented shelf roll-formed lengthwise thereof;

each said side wall panel is a monolithic one-piece member which is roll-formed in the lengthwise direction thereof, which lengthwise direction extends in a front-to-back direction when the box assembly is mounted on a vehicle, and which has a downwardly-oriented channel-shaped top rail roll-formed along an upper edge thereof; and each said side wall panel has an upwardly-facing shelf roll-formed longitudinally of the panel throughout the length thereof in downwardly spaced relationship from said top rail, the shelves on said front and side wall panels being at the same elevation and joined together at front corners of the box assembly.

5. A box assembly according to claim 4, wherein the side wall panels each have one or more reinforcing ribs roll-formed therein longitudinally thereof in a generally horizontal orientation.

6. A box assembly according to claim 4, wherein each said side wall panel has the upwardly-facing shelf formed therein at an elevation above a wheel well housing which joins to said side wall panel, said shelf extending lengthwise throughout substantially the entire longitudinal extent of said side wall panel.

7. A box assembly according to claim 1, wherein a channel-shaped cross rail is integrally and monolithically joined to and extends lengthwise along a lower edge of the front wall panel and protrudes sidewardly therefrom for disposition beneath a front end of said floor, said front panel and said cross rail being roll-formed as a single one-piece monolithic constructional member.

8. A pickup truck box assembly having a horizontally extending floor, a pair of inner upright side wall panels fixed relative to said floor adjacent opposite sides thereof and projecting upwardly therefrom, and an inner upright front wall panel fixed relative to said floor and projecting upwardly therefrom adjacent a front side thereof, the front wall panel having opposite ends thereof fixedly interconnected to respective front ends of said side wall panels, comprising the improvement wherein each said side wall panel is a monolithic one-piece panel roll-formed from metal sheet and having downwardly-oriented channel-shaped top rail roll-formed lengthwise along the upper edge thereof, each said side panel also having a generally upwardly-oriented shelf roll-formed therein at an elevation above a wheel well housing which joins to said side wall panel, said shelf extending lengthwise throughout substantially the entire longitudinal extent of said side wall panel in generally parallel but downwardly spaced relation relative to the respective top rail.

9. A box assembly according to claim 8, wherein the top rail of said side wall panel is tubular and is welded along the length thereof.

10. A box assembly according to claim 8, wherein the side wall panel and an adjacent side floor portion together are roll-formed as a monolithic one-piece integrated panel having a wheel well opening formed therein.

11. A box assembly according to claim 8, wherein said front wall comprises a monolithic one-piece member roll-formed of thin metal sheet and having a tubular top rail roll-formed lengthwise along the upper edge thereof and an upwardly-facing shelf roll-formed lengthwise in parallel but downwardly spaced relation relative to said tubular top rail.

12. A vehicle box assembly comprising:
a horizontally extending floor;
right and left upright inner side wall panels fixed relative to said floor adjacent opposite lengthwise-extending edges thereof and projecting upwardly therefrom;
an upright inner front wall panel fixed relative to said floor adjacent a front edge thereof and projecting upwardly therefrom, said front wall panel extending transversely between and fixedly interconnected to front edges of said right and left side wall panels;
each said side wall panel comprising a monolithic one-piece member formed from a thin metal sheet deformed to define a channel-shaped top rail which extends lengthwise along an upper longitudinally-extending edge of said side wall panel;
each said side wall panel also having a shelf structure formed therein at a location positioned downwardly from and extending lengthwise in generally parallel relationship to said top rail, said shelf structure defining an upwardly-facing horizontal support surface which extends continuously throughout the length of the side wall panel; and
said front wall panel comprising a monolithic one-piece member formed from a thin metal sheet deformed to define a channel-shaped top rail which extends lengthwise along an upper edge of said front panel so that the top rail on said front panel joins to the top rails on said side panels at front corners of the box assembly.

13. A vehicle box assembly according to claim 12, wherein said front wall panel has a shelf structure formed therein at a location downwardly from said top rail, said shelf structure defining thereon an upwardly-facing horizontal support surface which extends continuously throughout the length of the front wall panel so that opposite ends of the shelf on the front panel terminate adjacent the front corners of the box assembly, the horizontal support surface defined by the shelf structure on the front wall panel being substantially horizontally coplanar with the horizontal support surfaces defined by the shelf structures on the right and left side wall panels.

14. A vehicle box assembly according to claim 12, wherein each of said front wall panel, right side wall panel and left side wall panel are roll formed from said thin metal sheet and each has transversely deformed reinforcing ribs formed therein with said ribs being disposed in sidewardly spaced but parallel relationship and extending horizontally throughout the length of the respective panel.

15. A vehicle box assembly according to claim 12, wherein each said front wall panel, right side wall panel and left side wall panel is roll-formed from thin metal sheet.

16. A box assembly according to claim 15, wherein each said side wall panel has a side floor portion roll-formed as an integrated and monolithic part thereof and protruding generally perpendicularly therefrom.

17. A box assembly according to claim 13, wherein each said front wall panel, right side wall panel and left side wall panel is roll-formed from thin metal sheet, and wherein the top rail and the shelf structure associated with each respective wall panel are rollformed therein so as to extend horizontally throughout the length of the respective wall panel.

* * * * *